(12) United States Patent
Pnini et al.

(10) Patent No.: US 8,107,779 B2
(45) Date of Patent: Jan. 31, 2012

(54) OPTICAL CROSSBAR SWITCH

(75) Inventors: Boaz Pnini, Goeggingen (DE); Ze'ev Ganor, Herzlia (IL); Rahav Cohen, Ra'anana (IL); Menachem Eizenshtat, Ra'anana (IL)

(73) Assignee: Fiberzone Networks Ltd., Petah Tikva (IL)

( * ) Notice: Subject to any disclaimer, the term of this patent is extended or adjusted under 35 U.S.C. 154(b) by 287 days.

(21) Appl. No.: 12/528,449

(22) PCT Filed: Feb. 26, 2008

(86) PCT No.: PCT/IL2008/000240
§ 371 (c)(1),
(2), (4) Date: Oct. 28, 2009

(87) PCT Pub. No.: WO2008/104972
PCT Pub. Date: Sep. 4, 2008

(65) Prior Publication Data
US 2010/0054659 A1    Mar. 4, 2010

Related U.S. Application Data

(60) Provisional application No. 60/903,293, filed on Feb. 26, 2007.

(51) Int. Cl.
*G02B 6/12* (2006.01)
*G02B 6/26* (2006.01)
(52) U.S. Cl. ............................. 385/17; 385/15; 385/16
(58) Field of Classification Search .............. 385/15–18, 385/21, 52, 134–138, 88, 89, 92; 398/50, 398/56, 57
See application file for complete search history.

(56) References Cited

U.S. PATENT DOCUMENTS
3,943,366 A    3/1976 Platz et al.
(Continued)

FOREIGN PATENT DOCUMENTS
EP          0631165          12/1994
(Continued)

OTHER PUBLICATIONS

Katagiri T et al: "A Construction Method for Non- Blocking, Large Matrix Size Optomechanical Switch" IEICE Transactions on Communications, Communications Society, Tokyo, JP, vol. E76-B, No. 11, Nov. 1, 1993, pp. 1470-1473, XP000425081 ISSN: 0916-8516 the whole document.

*Primary Examiner* — Brian M. Healy
*Assistant Examiner* — Mary El Shammaa
(74) *Attorney, Agent, or Firm* — The Law Offices of Michael E. Kondoudis

(57) ABSTRACT

An optical crossbar switch for optically coupling optic fibers comprising: at least one first fiber and a plurality of second fibers; a moveable fiber-end carriage coupled to an end of the at least one first fiber and having at least one latching hook and being constrained to move along a predetermined trajectory; at least one moveable slack-control carriage coupled to the body of the at least one first fiber and constrained to move along a predetermined trajectory; an array of sockets defined by walls, at least one of which walls of each sockets formed having a latch hole for receiving the latching hook; and at least one moving device controllable to move the carriages; wherein to optically couple a first fiber to a second fiber, the at least one moving device moves the fiber-end carriage of at least one of the first and second fibers to a socket and inserts the fiber's fiber end into the socket so that the at least one latching hook latches into the latch hole and secures the carriage to the socket array.

6 Claims, 15 Drawing Sheets

U.S. PATENT DOCUMENTS

| | | |
|---|---|---|
| 4,054,800 A | 10/1977 | Leask |
| 4,193,662 A | 3/1980 | Hara |
| 4,450,706 A | 5/1984 | Engelmohr |
| 5,613,021 A | 3/1997 | Saito et al. |
| 5,661,826 A | 8/1997 | Saito et al. |
| 6,307,983 B1 | 10/2001 | Goossen |
| 6,363,136 B1 | 3/2002 | Flisikowski et al. |

FOREIGN PATENT DOCUMENTS

| | | |
|---|---|---|
| WO | 02/43432 | 5/2002 |
| WO | 2006/054279 | 5/2006 |

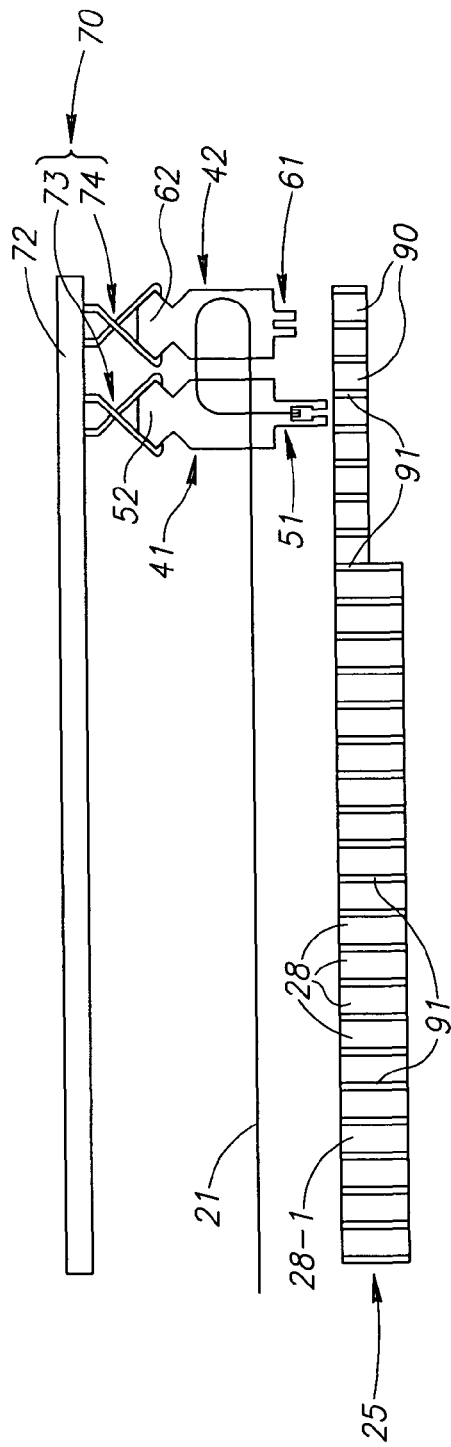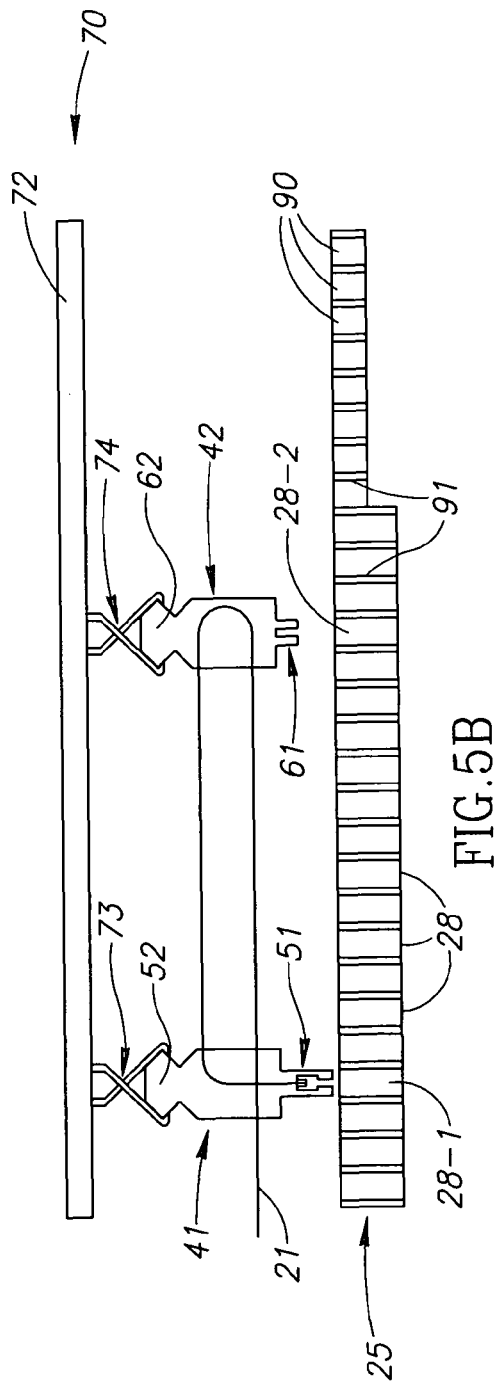

OPTICAL CROSSBAR SWITCH

RELATED APPLICATIONS

The present application is a US National Phase of PCT Application No. PCT/IL2008/000240, filed on Feb. 26, 2008, which claims the benefit under 35 U.S.C. 119(e) of U.S. Provisional Application 60/903,293 filed on Feb. 26, 2007, the disclosure of which is incorporated herein by reference.

FIELD OF THE INVENTION

The invention relates to crossbar switches and in particular to optical crossbar switches.

BACKGROUND OF THE INVENTION

A crossbar switch generally operates to connect any one of a first plurality of signal ports to any one of a second plurality of signal ports. Generally, signal ports in the first and second pluralities of signal ports are bi-directional and any of the first or second ports in the crossbar switch can be used to both receive and transmit signals. The crossbar switch operates as a router that routes a signal received on any one of its ports in the first or second plurality of ports to a desired port of the other of the first and second plurality of ports from which the signal is transmitted. Crossbar switches are typically used, for example, for routing signals in communication networks such as LANs, WANs, and telecommunication networks and in routing data signals between processors comprised in parallel data processing systems.

In many communication networks, signals are optical signals that are transmitted along optic fibers and routing is accomplished by optical crossbar switches. A first plurality of signal ports are ends of a first plurality of optic fibers and a second plurality of signal ports are ends of a second plurality of fibers. The crossbar switch operates to optically couple an end of a given fiber of the first plurality of optic fibers to an end of a given fiber of the second plurality of optic fibers, to provide a desired connection.

Optical crossbar switches are often required to accommodate very large numbers of optic fibers. As the number of fibers increases, the task of efficiently managing connecting and disconnecting large numbers of optic fiber ends without fibers becoming entangled becomes increasingly complex. Prior art crossbar switches for optically coupling and uncoupling large numbers of optic fibers tend to be complicated, unwieldy pieces of equipment that require relatively large volumes of operating space to accommodate the coupling and uncoupling operations.

U.S. Pat. No. 5,613,021 describes an optical crossbar switch in which a robot hand connects and disconnects ends of a plurality of first fibers to ends of a plurality of second fibers, which second fibers have their ends held stationary in a rectangular array in a coupling board. As an end of a fiber in the first plurality of fibers is connected or disconnected to an end of a fiber in the second plurality of fibers, length of the first fiber is respectively played out or "reeled in" by a fiber length adjusting unit which requires its own significant space volume. The robot hand "mimics" the way in which a human switch board operator operates a telephone switch board, plugging and unplugging telephone cables from a switch board. During operation of the switch, first optic fibers cross each other as they are connected and unconnected from different second optic fibers. In an embodiment of the invention, the adjusting unit comprises a pair of rotatable reels on which surplus portions of the first fiber are wound. The reels are spring loaded to urge them apart and take up slack in the fiber wound between them.

U.S. Pat. No. 6,307,983 describes an optical crossbar switch in which patch fibers are used to connect ends of a plurality of first fibers to ends of a plurality of second fibers. A first end of each of the patch fibers is connected to an end of a first fiber. The ends of the second fibers are mounted to a circular holding ring. The second ends of the patch fibers are mounted to a linear conveyor. The conveyor sequentially loads the second end of each patch fiber at a different desired loading location on the perimeter of a "loader ring", which is coaxial with the holding ring that holds the ends of the second fibers and has a same diameter as the holding ring. The second end of a patch fiber is loaded to the desired location on the loader ring by suitably rotating the loader ring about the axis of rotation and translating the linear conveyor so that the position of the second end of the patch fiber on the linear conveyor meets the desired location on the loader ring perimeter. After the loading ring is loaded with the second ends of the patch fibers, the loading ring is translated along the common axis it shares with the holding ring to "dock" the second ends of the patch fibers with the ends of the second fibers. A configuration of connections between the first and second pluralities of fibers is determined by the positions of the patch fiber second ends on the loader ring and an azimuth angle of the loader ring relative to the holding ring.

PCT publication WO 02/43432, the disclosure of which is incorporated herein by reference, describes an optical crossbar switch in which any given one of a plurality of first optic fibers is optically coupled to any given one of a plurality of second optical fibers by translating the ends of the given fibers along different linear trajectories.

SUMMARY OF THE INVENTION

An aspect of some embodiments of the present invention relates to providing an improved optical crossbar switch that provides for efficient management of the coupling and uncoupling of relatively large numbers of optic fibers in a relatively small volume of space.

An aspect of some embodiments of the invention relates to providing an optical crossbar switch wherein large numbers of optic fibers may be coupled and uncoupled without the fibers becoming entangled.

An aspect of some embodiments of the invention relates to providing an optical crossbar switch for optically coupling and uncoupling optical fibers wherein substantially no slack is generated in optic fibers during the process of optically coupling and uncoupling fibers.

In accordance with an embodiment of the invention, an optical crossbar switch comprises first and second pluralities of respectively first and second optic fibers. Each fiber is coupled to a different pair of moveable "fiber-end" and "slack-control" carriages. The fiber-end carriage of the pair is coupled to an optical end, hereinafter a "switch end", of the fiber and the slack-control carriage is coupled to the body of the fiber. The crossbar switch comprises at least one device, hereinafter "a mover", controllable to move the fiber-end carriage of each of the fibers so as to optically couple the switch end of any first fiber to the switch end of any second fiber by positioning the ends opposite to and facing each other. When moving the fiber-end carriage of a fiber, the at least one mover moves the slack-control carriage of the fiber to take up slack in the fiber generated by motion of the fiber-end carriage or to "reel out" a length of fiber required to enable free motion of the fiber-end carriage.

In some embodiments of the invention, a same mover is used to move the fiber-end and slack-control carriages of a plurality of different first or second fibers. Optionally, the mover comprises two grabbers, which are controllable to substantially simultaneously grab the fiber-end and slack-control carriages of a first or second fiber and move them in accordance with an embodiment of the invention to couple the fiber to a second or first fiber respectively. In some embodiments of the invention, each fiber comprises its own exclusive mover. Optionally, the exclusive mover comprises a different motor for each of the fiber's fiber-end and slack-control carriages controllable to move the carriage.

In accordance with an embodiment of the invention, the at least one mover moves each of the fiber-end carriages of the first fibers along different, optionally straight-line, first trajectories. Optionally, the first trajectories are parallel and coplanar. Similarly, the at least one mover moves each of the fiber-end carriages of the second fibers along different, optionally straight-line, second trajectories. Optionally, the second trajectories are parallel and coplanar. Optionally, the planes of the first and second trajectories are parallel. A projection of each of the first trajectories on the plane of the second trajectories intersects each of the second trajectories. Optionally, the projection of a first fiber is perpendicular to the second trajectories. A point at which the projection of a first trajectory crosses over a second trajectory is referred to as a "crossover point" of the first and second trajectories, or alternatively, a crossover point of the first and second fibers associated with the trajectories.

To optically couple any given first fiber to any given second fiber, the at least one mover moves the fiber-end carriage of each of the given fibers to position the switch ends of the fibers facing their common crossover point. A minimum dynamic range of motion, hereinafter a minimum dynamic "coupling range", of a fiber-end carriage of a given first fiber sufficient to enable the first fiber to be coupled to any one of the second fibers, is substantially equal to a maximum distance between crossover points along the fiber's trajectory.

In an embodiment of the invention, the at least one mover moves the slack-control carriage of each optic fiber along a same trajectory along which it moves the fiber's fiber-end carriage in order to take up slack in the fiber or reel out fiber length. Optionally, the slack-control carriage operates like a moveable pulley relative to the fiber-end carriage. The fiber is threaded into and out of the slack-control carriage looping through at least one, optionally "U" shaped channel formed in the slack-control carriage or around a configuration of at least one pulley wheel comprised in the slack-control carriage. The at least one channel or pulley wheel configures the fiber so that, optionally, at least two lengths of the fiber lie between the fiber-end and slack-control carriages. In accordance with an embodiment of the invention, the at least one mover moves the slack-control carriage one half a distance that it moves the fiber-end carriage to increase or decrease the two lengths of the fiber in order to respectively take up or reel out fiber as needed. For such an embodiment, a minimum dynamic range of motion, referred to as a minimum dynamic "take-up range", for a given slack-control carriage is substantially equal to one-half the minimum dynamic coupling range of its associated fiber-end carriage.

In some embodiments of the invention, the fiber-end and slack-control carriages of an optic fiber are configured so that more than two lengths of a fiber lie between the fiber-end and slack-control carriages. For a given distance that the fiber-end carriage moves, the slack-control carriage moves a distance equal to about the given "fiber-end" distance divided by the number of fiber lengths that lie between the carriages to take up slack or reel out fiber. For example, in an embodiment of the invention, four fiber lengths lie between a given fiber-end carriage and its associated slack-control carriage. In such an embodiment, the slack-control carriage moves about one-fourth the distance that the fiber-end carriage moves and a minimum dynamic take-up range of the slack-control carriage is one-fourth the coupling range of the fiber-end carriage.

Optionally, to optically couple a first and a second fiber, subsequent to moving the switch ends of the fibers to their crossover point, the at least one mover moves the switch ends towards each other so that they are relatively close or substantially contiguous. Optionally, the crossbar switch comprises a "honeycomb" array of sockets located between the planes of the first and second trajectories. The socket array comprises a different socket for each fiber crossover point located in the neighborhood of the crossover point. To optically couple a given first fiber to a given second fiber, the at least one mover translates the switch end of the given fibers to their crossover point and inserts the switch end of each of the fibers into the socket.

In some embodiments of the invention, the socket functions to aid alignment of the switch ends. In some embodiments of the invention, the socket alternatively or additionally provides mechanical support for the coupled switch ends. Optionally, the socket provides mechanical support for the fiber-end carriages to which the switch ends are mounted and mechanically supports the carriages in positions that maintain the switch ends optically coupled.

In accordance with an embodiment of the invention, the crossbar switch is configured so that the first and second trajectories are arrayed with relatively small pitches and the dynamic coupling ranges and take-up ranges of the fiber-end and slack-control carriages are substantially equal to their respective minimum ranges. Optionally, to enable the relatively small pitches, the carriages are substantially planar structures having a relatively small thickness perpendicular to the trajectories along which they move. As a result, a relatively large number of first and second fibers can be accommodated by the crossbar switch and efficiently optically coupled and uncoupled in a relatively small volume. In addition, because the carriages associated with a given fiber move along a trajectory that is different from that of the other fibers, none of the first trajectories cross each other and none of the second trajectories cross each other and fibers don't tangle during operation of the switch.

In some embodiments of the invention, an optical cross bar switch comprises at least one patch fiber that is used to optically couple any first fiber of a plurality of "signal" fibers to any second fiber of the plurality of signal fibers. A first and a second fiber of the plurality of signal fibers are optically coupled by optically coupling their respective switch ends to different "patch" ends of a same patch fiber of the at least one patch fibers.

Each of the plurality of signal fibers is optionally coupled to a fiber-end and a slack-control carriage that move along a signal fiber trajectory to position the switch end of the signal fiber along the trajectory without generating substantial slack in the signal fiber. A first patch end of each patch fiber is mounted to a first fiber-end carriage and a second patch end of the patch fiber is mounted to a second fiber-end carriage. Each of the fiber-end carriages is moveable along an optionally same patch fiber trajectory that has a crossover point with the trajectory of each of the signal fibers.

To optically couple a first signal fiber with a second signal fiber, the switch ends of the signal fibers are moved to first and second crossover points respectively of the signal fibers with a same patch fiber of the at least one patch fiber. At the first crossover point the first fiber-end carriage of the patch fiber is moved to align the first patch end of the patch fiber facing the switch end of the first signal fiber so that optical signals may be transmitted between the first signal fiber and the patch fiber. Similarly, at the second crossover point the second fiber-end carriage of the patch fiber is moved to align the second patch end of the patch fiber facing the switch end of the second signal fiber so that optical signals may be transmitted between the second signal fiber and the patch fiber.

There is therefore provided, in accordance with an embodiment of the present invention, an optical crossbar switch for optically coupling optic fibers comprising: at least one first fiber and a plurality of second fibers; a moveable fiber-end carriage coupled to an end of the at least one first fiber and constrained to move along a predetermined trajectory; at least one moveable slack-control carriage coupled to the body of the at least one first fiber and constrained to move along a predetermined trajectory; and at least one moving device controllable to move the carriages; wherein to optically couple a first fiber of the at least one first fiber to a second fiber of the plurality of second fibers, the at least one moving device moves the fiber-end carriage of the first fiber along its trajectory to a position at which the end of the first fiber is optically coupled to an end of the second fiber and moves the at least one slack-control carriage to take up slack in the first fiber generated by movement of its fiber-end carriage.

Optionally, both ends of a first fiber are coupled to different fiber-end carriages moveable along predetermined trajectories and the at least one moving device moves the carriages to positions at which the ends of the first fiber are optically coupled to ends of different second fibers to optically couple the second fibers to each other. Alternatively or additionally, the at least one slack-control carriage comprises two slack control carriages.

In an embodiment of the invention, to optically couple the first fiber to a second fiber the at least one moving device moves the fiber-end carriage of the first fiber to align the end of the first fiber facing the end of the second fiber.

In an embodiment of the invention, ends of the second fibers are located at fixed positions.

In some embodiments of the invention, the crossbar switch comprises a moveable fiber-end carriage coupled to the end of each second fiber and a moveable slack-control carriage coupled to the body of each second fiber, which carriages are constrained to move along predetermined trajectories. Optionally to couple a first fiber to a second fiber, the at least one moving device moves the fiber-end carriage of the second fiber to align the end of the second fiber facing the end of the first fiber. Additionally or alternatively a projection of the trajectory of each fiber-end carriage of the at least one first fiber crosses the trajectories of the fiber-end carriages of all the second fibers.

In some embodiments of the invention, the projection of the trajectory of the fiber-end carriage of a first fiber is perpendicular to the trajectories of the fiber-end carriages of the second fibers that it crosses.

In some embodiments of the invention, the trajectories of the fiber-end carriages of the second fibers are parallel.

In some embodiments of the invention, the trajectories of the fiber-end carriages of the second fibers are coplanar.

In some embodiments of the invention, the at least one first fiber comprises a plurality of first fibers. Optionally, the trajectories of the fiber-end carriages of the first fibers are parallel. Additionally or alternatively, the trajectories of the fiber-end carriages of the first fibers are optionally coplanar. Additionally or alternatively, optionally, the trajectories of the fiber-end carriages of the first fibers are coplanar and the trajectories of the fiber-end carriages of the second fibers are coplanar and the planes of the trajectories are parallel.

In some embodiments of the invention, the trajectories of the fiber-end carriages are straight-line trajectories.

In some embodiments of the invention, the trajectories of the slack-control carriages are straight-line trajectories.

In some embodiments of the invention, the fiber-end and slack-control carriages associated with a same fiber move along a substantially same trajectory.

In some embodiments of the invention, for a given fiber coupled to a fiber-end carriage and at least one slack-control carriage at least two lengths of the fiber body extend between the fiber-end carriage and a slack-control carriage of the at least one slack-control carriage and a section of the fiber body coupled to the at least one slack-control carriage is free to move along its length. Optionally, a slack-control carriage of the at least one slack-control carriage is formed with a channel and the section of the fiber body is threaded through the channel. Additionally or alternatively, a slack-control carriage of the at least one carriage is optionally formed with a groove along which the section of the fiber lies. Additionally or alternatively, a slack-control carriage of the at least one slack-control carriage optionally comprises a pulley wheel and the fiber body loops around a region of the rim of the pulley wheel.

In some embodiments of the invention, the at least one moving device for moving carriages comprises at least two grabbers controllable to simultaneously grab the fiber-end carriage and the at least one slack-control carriage of a fiber. Optionally, the grabbers are controllable to simultaneously move the fiber-end carriage and the at least one slack-control carriage of the fiber along their respective trajectories.

In some embodiments of the invention, the at least one moving device for moving the carriages comprises a motor for each carriage controllable to move the carriage along its trajectory.

In some embodiments of the invention, each carriage is mounted to a guide rail along which the carriage moves.

An optical crossbar switch according to any of the preceding claims and comprising an array of sockets and wherein to optically couple a first fiber to a second fiber, the at least one moving device moves the fiber-end carriage of at least one of the first and second fibers to a socket and inserts the fiber's fiber end into the socket. Optionally, the socket provides support for maintaining the fiber-end carriage in a position that provides optical contact of the fibers.

In some embodiments of the invention, the fiber-end carriage of a fiber comprises a light director controllable to direct light that exits the end of the fiber so that the light is incident on the end of another fiber.

Optionally, the light director is controllable to deflect light that exits the fiber selectively along different directions. Alternatively or additionally, the light director is optionally controllable not to deflect light that exits the fiber. Additionally or alternatively the light director optionally comprises a light pipe. Additionally or alternatively, the light director optionally comprises an optical switch controllable to direct light along different directions. Optionally, the optical switch is controlled electronically. Additionally or alternatively, the optical switch is optionally controlled acoustically.

BRIEF DESCRIPTION OF FIGURES

A description of examples of embodiments of the present invention that references figures attached hereto is given below. In the figures, identical structures, elements or parts that appear in more than one figure are generally labeled with the same numeral in all the figures in which they appear. Dimensions of components and features shown in the figures are chosen for convenience and clarity of presentation and are not necessarily shown to scale. The figures are listed below.

FIGS. 5A-5D schematically illustrate motion of a fiber-end and a slack-control carriage coupled to a fiber that provides for free motion of the fiber-end carriage without generating slack in the fiber, in accordance with an embodiment of the invention;

DETAILED DESCRIPTION OF EXAMPLES OF EMBODIMENTS

Figure 1:
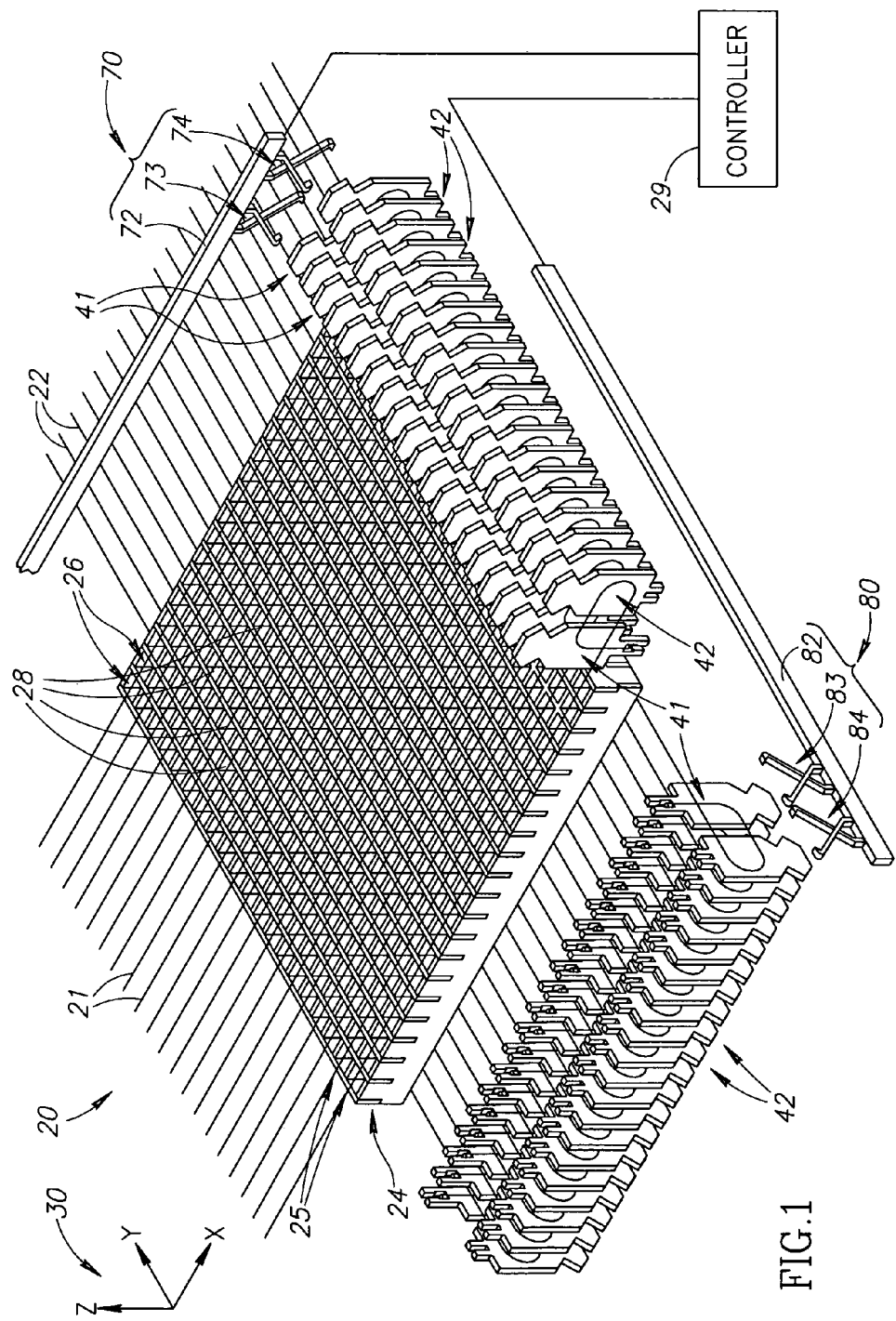
FIG. 1 schematically shows an optical crossbar switch, in accordance with an embodiment of the present invention.

FIG. 1 schematically shows an optical crossbar switch 20, in accordance with an embodiment of the present invention. Crossbar switch 20 comprises a first plurality of optic fibers 21, hereinafter referred to as "top optic fibers" 21, and a second plurality of optic fibers 22, hereinafter referred to as "bottom optic fibers" 22. Optionally, within switch 20, top fibers 21 are coplanar and perpendicular to bottom fibers 22, which are optionally coplanar. Each optic fiber 21 and 22 is mounted to a fiber-end carriage 41 and a slack-control carriage 42, and is shown in FIG. 1 without obstruction by appurtenances that might be used to couple the fiber to the carriages in order to more clearly illustrate how the fiber is spatially configured, in accordance with an embodiment of the invention.

Optionally, crossbar switch 20 comprises a rectangular honeycomb array 24 of columns 25 and rows 26 of sockets 28 located between the plane of top fibers 21 and the plane of bottom fibers 22. In an embodiment of the invention, each top fiber 21 extends along a different column 25 of sockets 28 and each bottom fiber 22 extends along a different row 26 of the sockets. A controller 29 controls crossbar switch 20 to optically couple any given one of top optic fibers 21 to any given one of bottom optic fibers 22 by inserting fiber-end carriages of the given top and bottom fibers into a same socket 28. The socket optionally aids in aligning the optic fibers and provides mechanical support for maintaining the fiber-end carriages, in positions that provide optical contact of the fibers. In FIG. 1, none of top fibers 21 is connected to a bottom fiber 22 and all carriages 41 and 42 are in "parking positions" along the sides of socket array 24. In parking positions, fiber-end and slack-control carriages 41 and 42 are optionally supported in parking sockets, which, to prevent clutter, are not shown in FIG. 1. Parking sockets are discussed below.

For convenience of presentation, positions and orientations of components and elements of crossbar switch 20 are referenced with respect to a coordinate system 30. Rows 26 and columns 25 are parallel respectively to the x and y-axis of coordinate system 30. To prevent clutter, only some of identical features of crossbar switch 20 are labeled with reference numerals.

Figure 2:
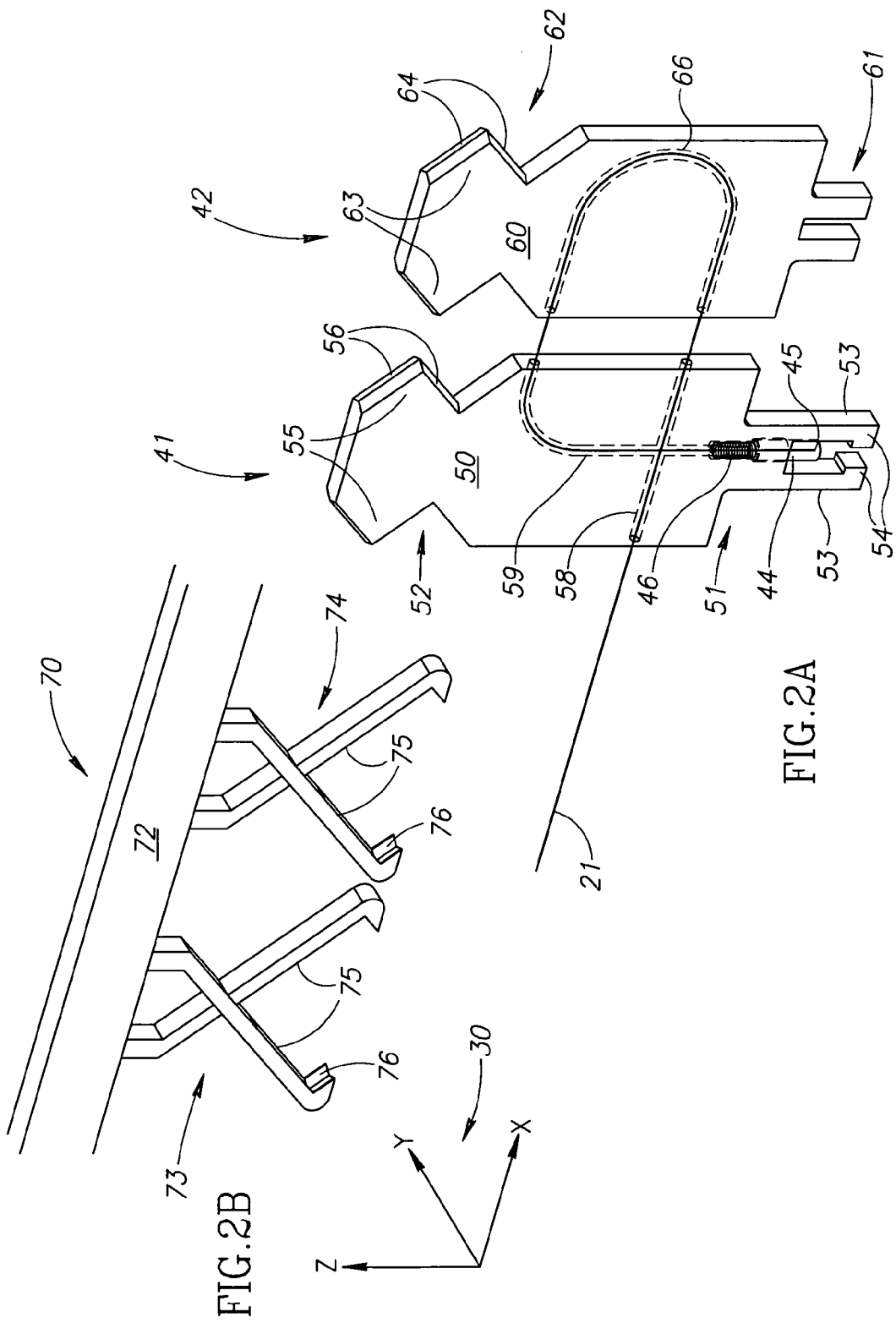
FIG. 2A schematically shows details of an optical fiber comprised in the optical crossbar switch shown in FIG. 1 coupled to a fiber-end and slack-control carriage, in accordance with an embodiment of the present invention.
FIG. 2B schematically shows a portion of a mover comprised in the optical crossbar switch shown in FIG. 1 and grabbers mounted to the mover, in accordance with an embodiment of the present invention.

FIG. 2A schematically shows details of a fiber 21, its fiber-end and slack-control carriages 41 and 42 and the way the fiber is mounted to the carriages. Internal features of the carriages germane to the discussion, which would normally be hidden from view in the perspective of the figure, are generally shown in dashed lines. The fibers themselves are shown as solid lines, even when hidden from view, for clarity of presentation. Bottom fibers 22 are optionally mounted to their fiber-end and slack-control carriages 41 and 42 similarly to the way in which top fibers 21 are mounted to their carriages. The discussion of the way in which a top fiber 21 is mounted to its carriages applies equally well to the way in which a bottom fiber 22 is mounted to its carriages.

Fiber-end carriage 41 optionally comprises a flat plate 50 having a socket prong 51 and a carrying handle 52. Optionally, socket prong 51 comprises two alignment tines 53, each having a tooth 54. Optionally, carrying handle 52 comprises two "V" shaped gripping protrusions 55, each formed by beveled edges 56. Plate 50 is optionally formed to have a "transfer" channel 58 and a "cross" channel 59 through which fiber 21 is threaded. Slack-control carriage 42 optionally comprises a flat plate 60 having a bifurcated socket prong 61 and a carrying handle 62. Optionally, carrying handle 62 comprises two V shaped gripping protrusions 63, each formed by beveled edges 64. Optionally, handles 52 and 62 are identical. Optionally, slack-control carriage 60 is formed to have a single "U" shaped "return" channel 66 through which fiber 21 is threaded.

Fiber 21 is threaded through transfer channel 58 in its fiber-end carriage 41 so that it passes through the fiber-end carriage and enters return channel 66 in slack-control carriage 42. Return channel 66 returns the fiber back to fiber-end carriage 41 where it is received by cross channel 59. Cross channel 59 optionally intersects transfer channel 58 and directs fiber 21 so that it crosses a portion of the fiber threaded through transfer channel 58 and continues on to a coupling nub 44 to which an end 45, i.e. a "switch end", of the fiber is anchored. Optionally, coupling nub 44 protrudes from socket prong 51 and is spring loaded, optionally by a spring 46, so that it is resiliently pressed to extend from the socket prong. A suitable stop (not shown) prevents spring 46 from ejecting nub 44 from socket prong 51. Channels 55 and 56 in fiber-end carriage 41 and channel 64 in slack-control carriage 42 are formed using any of various methods and devices known in the art, so that fiber 21 is free to move easily along the channels.

It is noted, it is possible to configure channels differently from the manner in which they are configured in FIG. 2A. For example, transfer channel 58 in fiber-end carriage 41 could be positioned opposite the top end of U shaped return channel 66 in slack-control carriage 42 rather than opposite the bottom end of the return channel. In such a configuration, an optic fiber threaded through the transfer channel and return channel 66 back to fiber-end carriage 41 would optionally not be received by cross-channel 59, but by a channel that does not cross the transfer channel. The optic fiber would not cross itself in the fiber-end carriage.

Optionally, crossbar switch 20 comprises a top mover 70 as shown in FIG. 1, for moving and positioning fiber-end and slack-control carriages 41 and 42 of any given top fiber 21 along column 25 of sockets 28 associated with the given top fiber. In FIG. 1, top mover 70 is shown in a parking position in which it is located along an edge of socket array 24 and is not grasping any carriage 41 or 42.

Optionally, top mover 70 comprises a carrier beam 72, and identical fiber-end and slack-control carriage grabbers 73 and 74 respectively. A portion of carrier beam 72 and grabbers 73 and 74 are shown enlarged in FIG. 2B. Each grabber 73 and 74 optionally comprises a pair of opposed tongs 75 shaped to receive a gripping protrusion 55 or 63 of carrying handle 52 or 62 respectively and having a groove 76 shaped to match the bevel shape of edges 56 or 64 of the gripping protrusion. Carrier beam 70 is supported by a suitable structure (not shown) that maintains the beam parallel to the x-axis and is controllable by controller 29 to move the carrier beam parallel to the y-axis so as to align the beam over and parallel to any column 25 (FIG. 1) of sockets 28.

Each grabber 73 and 74 is controllable to be moved along beam 72, i.e. along the x-direction and up and down along the z-direction. Tongs 75 of the grabber are controllable to be spread apart and closed toward each other to grasp, hold and release a carrying handle 52 or 62 as required. Once top mover 70 is aligned over a column 25 of sockets 28, each grabber 73 and 74 is therefore controllable to grasp a carriage 41 or 42 of top fiber 21 associated with the column by its handle, move the carriage along the column of sockets and insert the carriage's socket prong 51 into any one of the sockets in the column.

The bevel shape of edges 56 and 64 and matching grooves 76 of tongs 75 of a grabber 73 or 74 assure alignment of the tongs with V-protrusions 55 or 63 of a carriage carrier handle 52 or 62 when the grabber is used to grasp the carriage. The matching bevel edges 56 or 64 and grooves 76 also tend to promote stability of coupling between a grabber 73 or 74 and a carriage when carrying handle 52 or 62 is grasped by the grabber and tends to prevent the handle from slipping out from the grasp of the grabber.

Optionally, crossbar switch 20 comprises a bottom mover 80 (FIG. 1) for moving carriages 41 and 42 associated with bottom optic fibers 22. Optionally, bottom mover 80 comprises a beam 82 and grabbers 83 and 84 and is similar to and operates similarly to top mover 70 except that its beam 82 is parallel to the y-axis and moveable along the x-axis.

Controller 29 controls crossbar switch 20 to optically couple any given one of top fibers 21 to any given one of bottom fibers 22 by controlling top and bottom movers 70 and 80 to move the respective fiber-end carriages 41 of the given fibers to a socket 28 at their common crossover point and to insert their respective socket prongs 51 into the socket.

Figure 3:
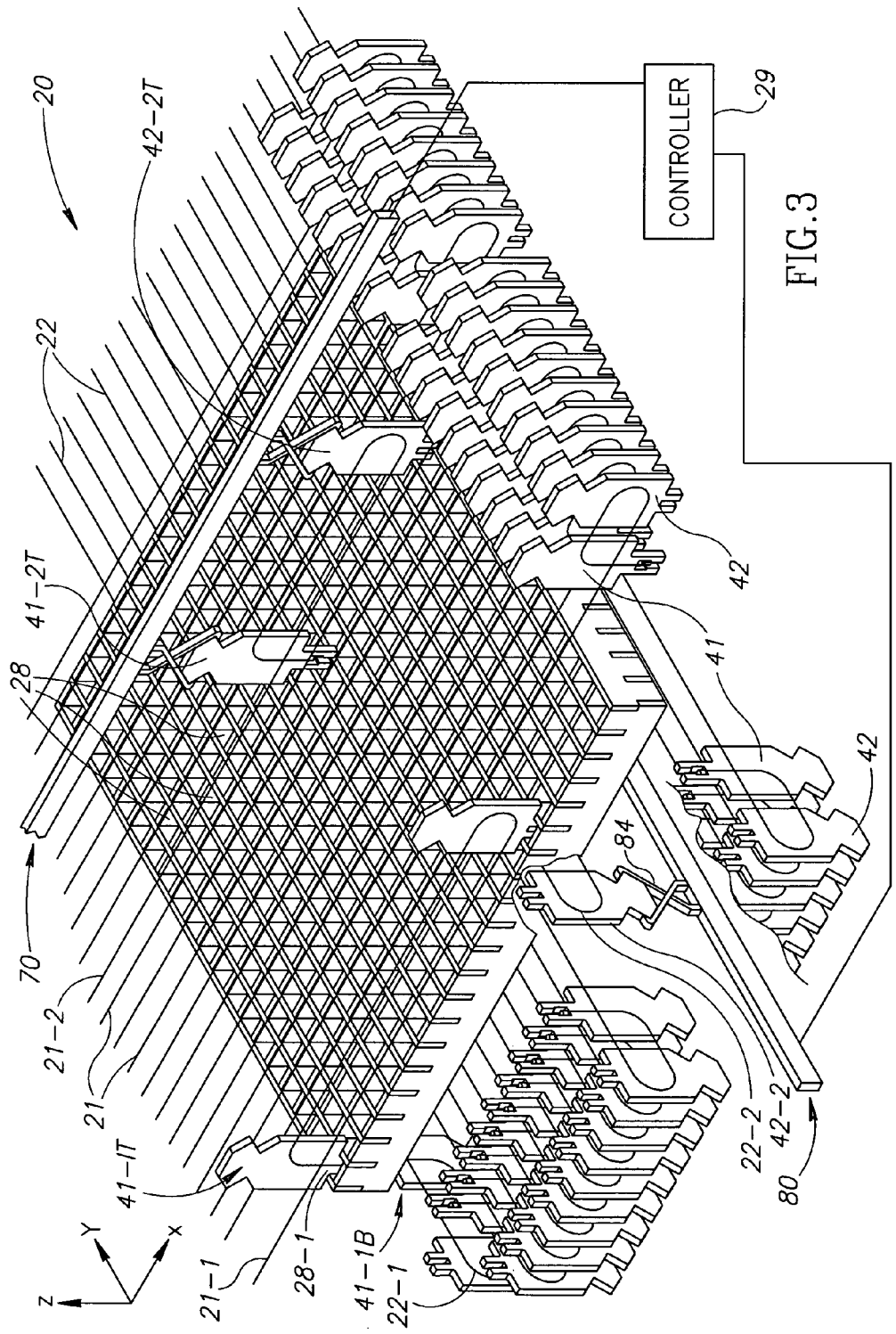
FIG. 3 schematically shows top and bottom fibers in the crossbar switch shown in FIG. 1 in which some fibers are optical coupled and some fibers are in the process of being optically coupled, in accordance with an embodiment of the present invention.

FIG. 3 schematically shows crossbar switch 20 after controller 29 has controlled top and bottom movers 70 and 80 to optically couple a top fiber 21, labeled 21-1, to a bottom fiber 22, labeled 22-1. Fiber-end carriage 41 of top fiber 21-1, indicated by alphanumeric 41-1T, and fiber-end carriage 41 of bottom fiber 22-1, indicated by alphanumeric 41-1B, are inserted into a common socket 28 labeled 28-1.

FIG. 3 also schematically shows controller 29 controlling top and bottom movers 70 and 80 to optically couple top and bottom fibers 21 and 22 labeled respectively by alphanumerics 21-2 and 22-2. Top mover 70 is shown moving fiber-end and slack-control carriages of top fiber 21-2, which are labeled 41-2T and 42-2T respectively, so as to couple the fiber to bottom fiber 22-2. Carriages 41-2T and 42-2T are shown just prior to being inserted into appropriate sockets 28. Portions of crossbar switch 20 are cutaway to show a portion of bottom mover 80 being controlled to couple bottom fiber 22-2 to top fiber 21-2. In the portion of mover 80 shown in FIG. 3, grabber 84 is shown grasping and moving slack-control carriage 42, labeled 42-2, of bottom fiber 22-2. Grabber 82 (FIG. 1), which is moving fiber-end carriage 41 of the fiber, is not seen in the figure.

Figure 4:
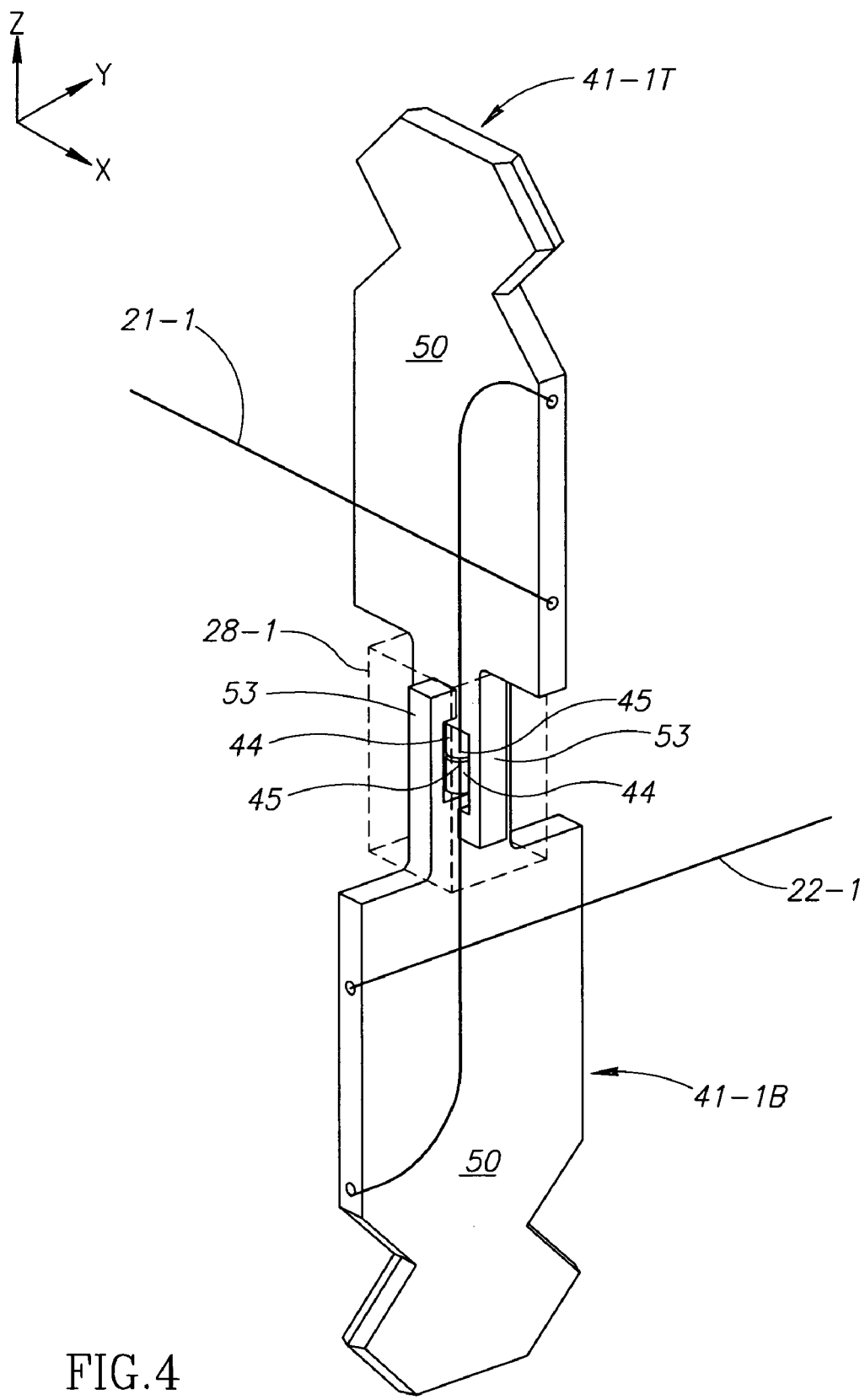
FIG. 4 schematically shows the fiber-end carriages of a top and bottom fiber shown in FIG. 3 inserted into a socket, in accordance with an embodiment of the invention.

FIG. 4 schematically shows a greatly enlarged view of fiber-end carriages 41-1T and 41-1B inserted into socket 28-1, which is shown in dashed lines. Once inserted, spring loaded coupling nubs 44 of the fiber-end carriages resiliently press switch ends 45 of the fibers together to provide optical coupling between the ends and thereby of the fibers. Alignment of switch ends 45 of fibers 21-1 and 22-1 is optionally provided by alignment tines 53 of respective fiber-end carriages 41-1T and 41-1B of top and bottom fibers 21-1 and 22-1. When fiber-end carriages 41-1T and 41-1B of the fibers are inserted into socket 28-1, alignment tines 53 of fiber-end carriage 41-1B of bottom fiber 22-1 grasp fiber-end carriage 41-1T of top fiber 21-1 and align ends 45 of the top and bottom fibers in the y-direction. Alignment tines 53 of fiber-end carriage 41-1T of top fiber 21-1 grasp fiber-end carriage 41-1B of bottom fiber 22-1 and align ends 45 of the fibers in the x-direction.

In some embodiments of the invention, tines 53 of socket prongs 51 of fiber-end carriages 41, in addition to aligning fiber-end carriages 41 and thereby ends 45 of top and bottom fibers 21 and 22 that are optically coupled, function to lock the fiber-end carriages of the fibers together once the carriages are inserted into a socket 28. For example, in some embodiments of the invention, tines 53 are elastic. When fiber-end carriages 41 of top and bottom fibers 21 and 22 are inserted into a same socket 28, teeth 54 of the tines of one carriage snap into matching grooves (not shown) in the other carriage to lock the carriages together. When required to decouple the fibers, controller 29 controls top and bottom movers 70 and 80 to pull fiber-end carriages 41 out of the socket into which they are inserted with sufficient force to unsnap the teeth from their grooves. The dimensions and/or internal shape of sockets 28 are adapted to accommodate motion of the elastic tines during insertion into and extraction from the sockets of the fiber-end carriages.

Springs 46, which resiliently press coupling nubs 44 against each other, are configured so that they do not apply sufficient force to unsnap teeth 54 once the carriages are locked together. It is noted that once fiber-end carriages 41 are inserted into a socket 28 to optically couple a top fiber 21 to a bottom fiber 22, the fiber-end carriages maintain in their positions optionally without power consumption until they are decoupled by operation of movers 70 and 80.

In accordance with an embodiment of the invention, when controller 29 (FIGS. 1 and 3) moves a fiber-end carriage 41 of a top or bottom fiber 21 or 22, it controls the fiber's slack-control carriage 42 to move in concert and take up slack in the fiber or reel out fiber length as required by the fiber-end carriage motion. Whichever way along a column of sockets that the controller moves the fiber-end carriage, it simultaneously moves the slack-control carriage in the same direction along the column but at half the velocity at which it moves the fiber-end carriage along the column.

By way of example, FIGS. 5A-5D schematically illustrate motion of fiber-end and slack-control carriages 41 and 42 of a top fiber 21 along a column 25 of sockets 28 as controller 29 (FIGS. 1 and 3) controls mover 70 to align the fiber-end carriage with a particular socket 28-1 and insert the fiber-end carriage into the socket.

In FIG. 5A controller 29 has controlled mover 70 and grabbers 73 and 74 to grasp fiber-end and slack-control carriages 41 and 42 by their respective carrier handles 52 and 62 and lift them out of their parking positions. In parking positions, the carriages are optionally inserted into and supported by parking sockets 90, which are shown for convenience of presentation half as deep as sockets 28. It is noted that since a parking socket 90 receives only a single carriage, while a socket 28 is required to receive two carriages (fiber-end carriages 41 of a top and a bottom fiber 21 and 22 when it is used to couple fibers) a parking socket 90 may in general be shallower than a socket 28.

In FIG. 5B, mover 70 has moved fiber-end carriage 41 from its parking position to align the carriage with a particular socket labeled 28-1. In order to provide sufficient length of fiber 21 so that fiber-end carriage 41 is free to move to socket 28-1 without generating slack in the fiber, controller 29 controls grabber 74 holding slack-control carriage 42 to translate the slack-control carriage along socket column 25 a distance equal to half that by which grabber 73 translates fiber-end carriage 41.

Distances between the parking positions of fiber-end and slack-control carriages 41 and 42 and sockets 28 are such that when fiber-end carriage 41 is aligned with a socket 28, translation of slack-control carriage 41 aligns the slack-control carriage with a socket 28, a parking socket 90 or with a wall 91 that separates adjacent sockets or parking sockets.

Figure 5C:
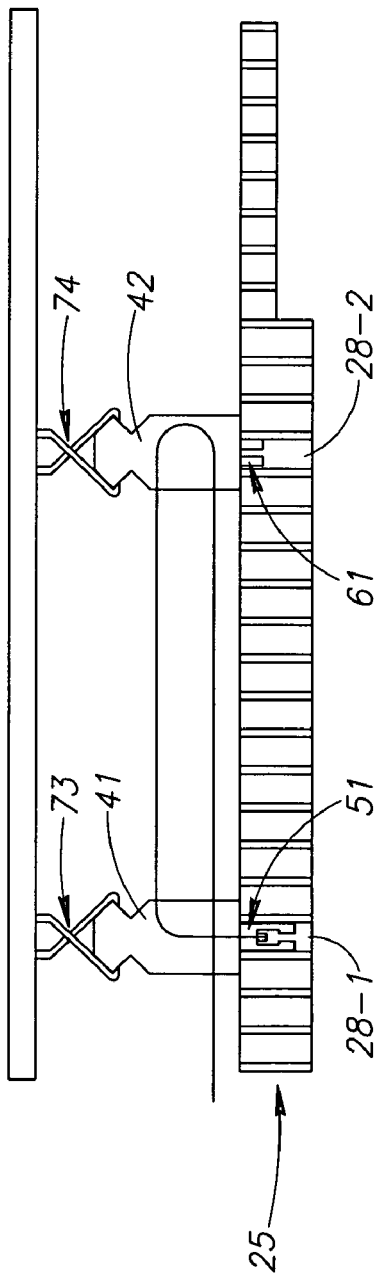

In FIG. 5B, slack-control carriage 42 is aligned with a socket 28 labeled 28-2. In FIG. 5C controller 29 has controlled grabbers 73 and 74 to insert socket prong 51 of fiber-end carriage 41 into socket 28-1 and bifurcated socket prong 61 of slack-control carriage 42 into socket 28-2. Controller 29 is now free to control mover 70 to release carriages 41 and 42 and proceed to move a different set of fiber-end and slack-control carriages.

Figure 5D:
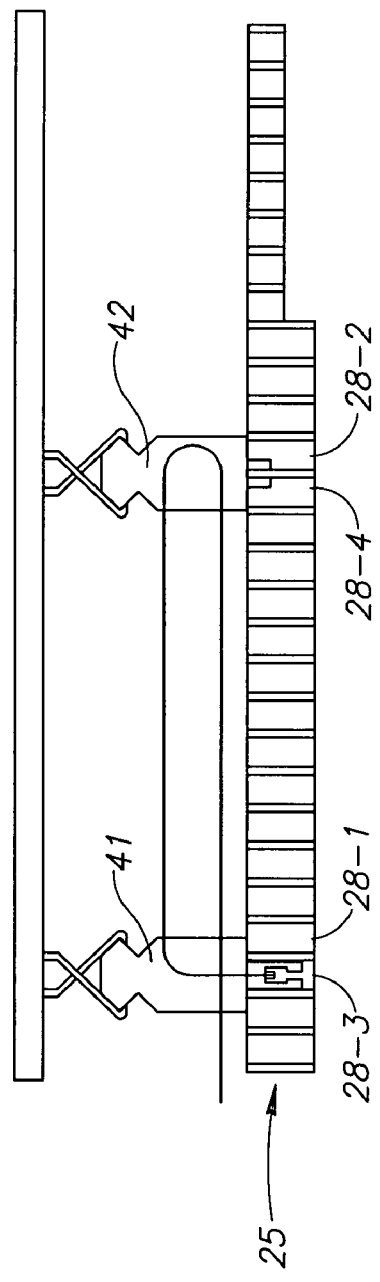

FIG. 5D schematically shows a case in which slack-control carriage 42 is aligned with a wall 91 that separates two sockets 28. Fiber-end carriage 41 is translated along column 25 to align the carriage with a socket 28-3 adjacent to socket 28-1. In FIG. 5D, fiber-end carriage 41 has been moved by a distance greater than that shown in FIG. 5C equal to a distance between adjacent sockets 28. In order to provide a length of top fiber 21 sufficient to provide free motion of the fiber-end carriage without generating slack in the fiber, slack-control carriage 42 is translated along column 25 by a distance (additional to that shown in FIG. 5C) equal to half a distance between adjacent sockets 28. As a result, slack-control carriage 42 is aligned with wall 91 between socket 28-2 and a socket 28-4. When fiber-end carriage 41 is inserted into socket 28-3, slack-control carriage 42 is inserted into sockets 28-2 and 28-4 and its bifurcated socket prong 61 straddles wall 91 between the sockets.

When moving fiber-end carriage 41 back to its parking position, controller 29 reverses the motions of fiber-end and slack-control carriages 41 and 42 schematically shown in FIGS. 5A-5D. The controller controls grabber 73 to translate fiber-end carriage 41 back to its parking position along column 25 at a speed that is twice the speed that it controls grabber 74 to translate slack-control carriage 42 back to its parking position.

The inventors have found that a crossbar switch in accordance with an embodiment of the invention, similar to crossbar switch 20 can be configured to accommodate and switch a relatively large number of optic fibers in a relatively small spatial volume. By way of a numerical example, in accordance with an embodiment of the invention, plates 50 and 60 of carriages 41 and 42 are optionally between about 0.5 mm to about 2.5 mm thick and have a width and height of about 20 mm and 50 mm respectively. (Thickness is a dimension along the y-axis in FIG. 2A, width a dimension along the x-axis and height a dimension along the z-axis). Optionally, socket prong 51 comprised in fiber-end carriage 41 and bifurcated socket prong 61 comprised in slack-control carriage 42 have widths (along the x-axis in FIG. 2A) between 0.5 mm and 2.5 mm. Optionally, socket prong 51 has a length (along the z-axis) between about 1 mm to 10 mm and bifurcated socket prong 61 a length between about 1 mm to 5 mm.

The plates may be fabricated using any of many different methods known in the art. For example, the plates may be fabricated from a sandwich comprising an inner layer of a suitable light material such as a plastic foam bonded between two external skins, optionally formed from a metal or plastic. Alternatively, for example, the plates may be formed by welding together optionally mirror-image planar plastic pieces, each having an external profile similar to that of carriage plates 50 and 60. When welded together, structures on sides of the pieces that face each other form channels through which an optical fiber is threaded, e.g. channels 58 and 59 in fiber-end carriage 41 and channel 66 in slack-control carriage 42.

Sockets 28 in honeycomb array 24 optionally have dimensions that match dimensions of socket prong 51 and bifurcated prong 61. For example, in some embodiments of the invention, sockets 28 have dimensions along the x and y-axes equal to about the width of the prongs 51 and 61, i.e. for prongs having a width of 1.5 mm for example, each socket has internal dimensions along the x and y-axes equal to about 1.5 mm. Optionally, sockets 28 have a depth along the z-axis between 2 mm to 10 mm. In some embodiments of the invention, walls separating adjacent sockets 28 in honeycomb array 24 have a thickness equal to about 0.2 mm.

Honeycomb socket array 24 may be formed using any of many different methods known in the art. Optionally, honeycomb array 24 is formed using techniques, methods and materials used to provide radiation collimators, for example, for CT scanners. Such methods are described, for example, in U.S. Pat. Nos. 6,363,136, 4,054,800, 4,450,706 and 3,943, 366, the disclosures of which are incorporated herein by reference. In FIGS. 1 and 3, the array is shown, by way of example, constructed from thin, identical, slotted strips of a suitable material.

Assume that the cross bar switch is intended to accommodate 1000 top fibers 21 and 1000 bottom fibers 22 and in conformity with the dimensions noted above that each socket 28 in the crossbar switch has a cross section parallel to the plane of the array that is about 1.5 mm. Assume further that each row 26 and column 25 of sockets 28 comprises about 6 cm of parking sockets 90 and that movers 70 and 80 require operating and clearance distance above honeycomb array 24 equal to about a height of a carriage plus about 20 cm. Then the crossbar switch requires a volume of about 1.5 m×0.25 m×0.25 m equal to about 0.1 m$^3$ to manage the coupling and uncoupling of the fibers.

Features of a crossbar switch similar to crossbar switch 20, in accordance with an embodiment of the invention, may vary from those described above. For example, in some embodiments of the invention, fiber-end carriages of top and bottom fibers 21 and 22 inserted into a socket 28 and switch ends 45 of their fibers may be held together by devices similar to tines 53 that are parts of coupling nubs 44 (FIG. 2A). Many and varied methods and devices for holding ends of optic fibers together to provide optical contact of the fibers are known in the art and any of these may be adapted for use with fiber-end carriages in accordance with an embodiment of the invention. In some embodiments of the invention, apparatus for holding fiber-end carriages 41 and switch ends 45 of their respective optic fibers 21 and 22 together comprise magnetized regions that attract and hold each other together when the carriages are inserted into a same socket 28. Such "magnetized" apparatus optionally comprises components that are parts of socket 28.

In some embodiments of the invention, honeycomb array 24 has a configuration that resembles more closely in its structure a natural honeycomb and comprises rows and columns of interlaced hexagonal sockets rather than square sockets. In some embodiment of the invention, an array similar to array 24 comprises "guide runners" that aid in maintaining carriages aligned with their respective columns or rows of sockets.

Figure 6:
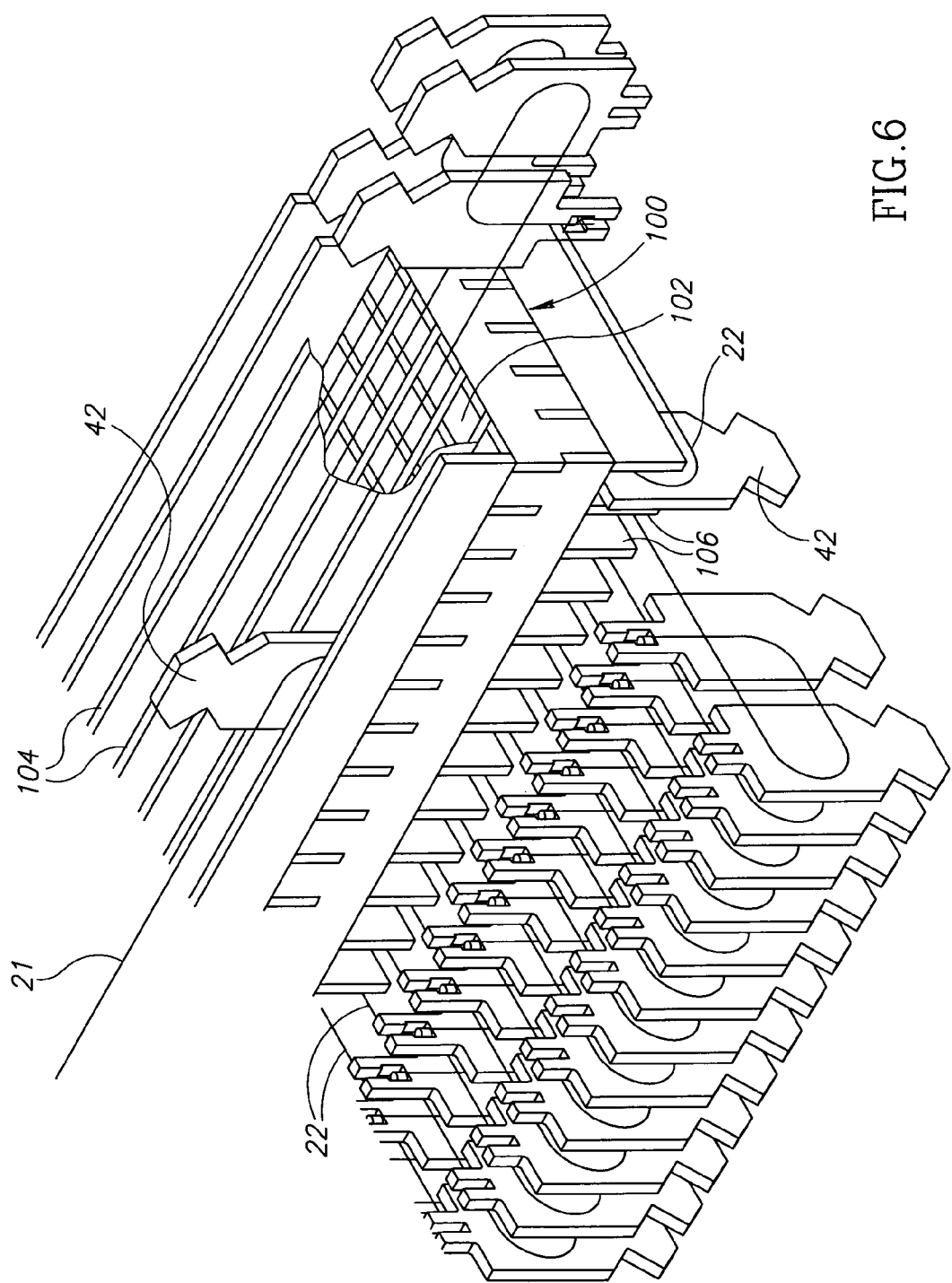
FIG. 6 schematically shows a portion of an optical crossbar switch comprising guide rails for aligning fiber-end and slack-control carriages with sockets, in accordance with an embodiment of the invention.

FIG. 6 schematically shows a portion, partially cutaway, of a honeycomb array 100 of optionally square sockets 102 comprising top and bottom runners 104 and 106 that maintain alignment of carriages of top and bottom fibers with their respective columns and rows of sockets. FIG. 6 schematically shows a slack-control carriage 42 of a top fiber 21 and a slack-control carriage 42 of a bottom fiber 22 between their associated guide runners 104 and 106 respectively after the carriages have been moved to accommodate coupling of fibers in the crossbar switch.

Figure 7:
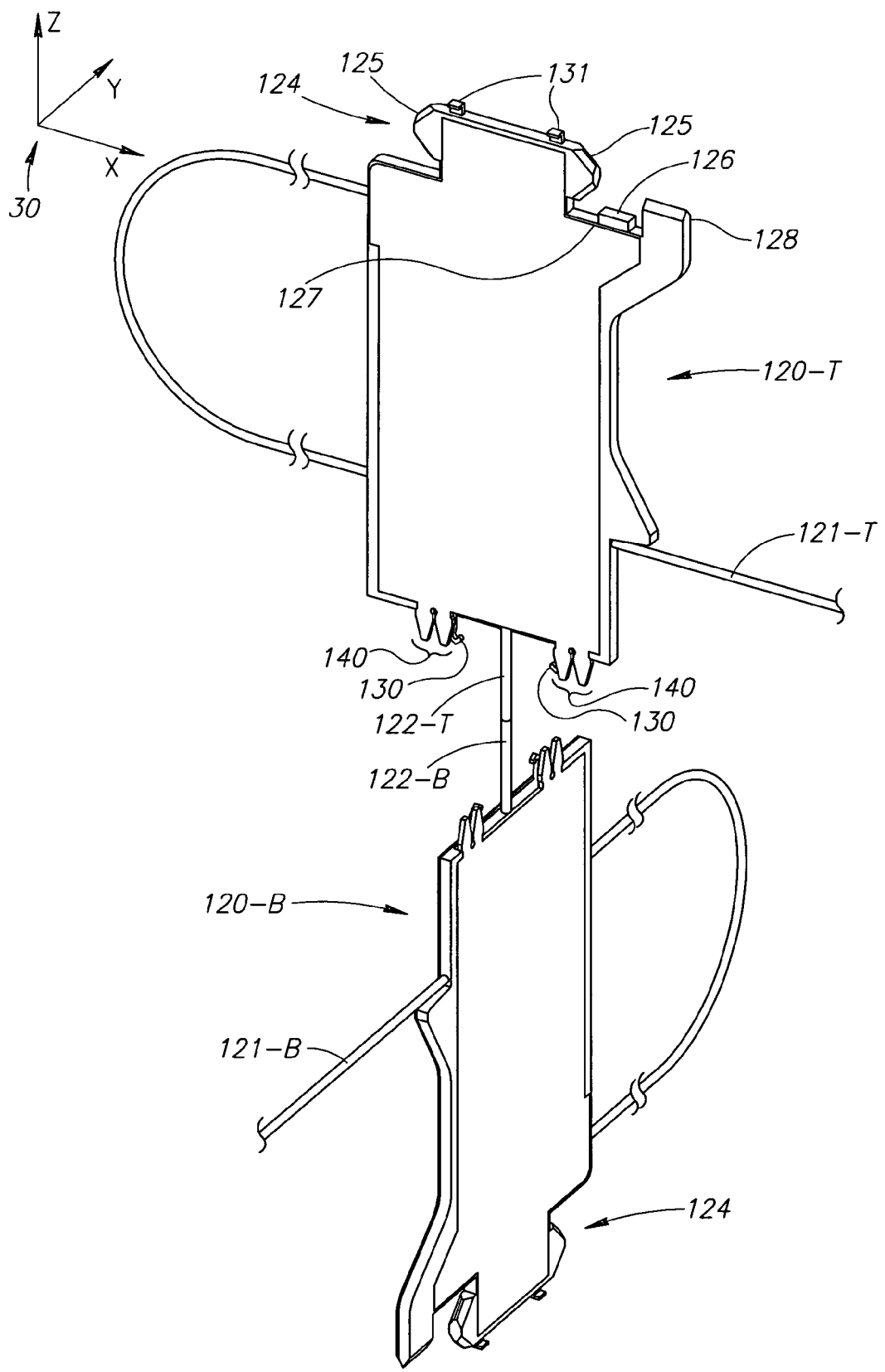
FIG. 7 schematically shows fiber-end carriages that differ from those shown in FIGS. 1-6 coupling two fibers, in accordance with an embodiment of the invention.

FIG. 7 schematically shows top and bottom fiber-end carriages 120-T and 120-B having a configuration in accordance with an embodiment of the invention different from that of fiber-end carriages 41. For convenience of presentation coordinate system 30 is used to reference location of features of the fiber-end carriages.

Fiber-end carriages 120-T and 120-B are shown in position to optically couple a top fiber 121-T of a crossbar switch (not shown) mounted to top fiber-end carriage 120-T to a bottom fiber 121-B in the crossbar switch mounted to bottom fiber-end carriage 120-B in accordance with an embodiment of the invention. Top and bottom fibers 121-T and 121-B are coupled to fiber end couplers 122-T and 122-B comprised in fiber-end carriages 120-T and 120-B respectively that are used to effect optical coupling of the fibers. Fiber-end carriages 120-T and 120-B are optionally mirror images of each other. Optionally, top and bottom fiber-end carriages are mirror images to within their fiber end couplers 122-T and 122-B, one of which is a male coupler and the other a matching female coupler. Fiber end couplers 122-T and 122-B may be configured in accordance with any methods and device known in the art.

Each fiber-end carriage 120-T and 120-B comprises at least one latching hook 130 and at least one bifurcated socket prong 140. By way of example, in FIG. 7, each fiber-end carriage 120-T and 120-B comprises two latching hooks 130 and two bifurcated socket prongs 140. Latching hooks 130 are latched into matching holes in walls of sockets in a honeycomb array of sockets, optionally similar to honeycomb socket 24 (FIG. 1), to "lock" the fiber-end carriage to the array when it is plugged into the array to couple its optic fiber to another optic fiber. The latching hooks are operated to hook the carriage to and unhook the carriage from the honeycomb array by applying force to latch hook "ears" 131. Latching hooks 130 and latch hook ears 131 and their operation are described below with reference to FIGS. 8-11. Bifurcated socket prongs 140 in a fiber-end carriage 120-T or 120-B are used to align the fiber-end carriage with sockets in the array and stabilize the carriage position when it is plugged into the array.

Each fiber-end carriage 120-T or 120-B comprises a carrying handle 124 optionally comprising two substantially V-shaped gripping protrusions 125. Carrying handle 124 is used similarly to carrying handle 52 of carriage 41 (FIGS. 2A and 2B) for grabbing and moving the carriage or inserting the carriage into sockets and extracting it from sockets in a honeycomb socket array of a crossbar switch. Optionally, an optical reflector 126 is located on a shoulder 127 of each fiber-end carriage 120-T and 120-B. The reflector is used to reflect light to a detector comprised in a mover optionally used to grab carrying handle 124 of the fiber end-carriage 120-T or 120-B and move and position the carriage for coupling its associated fiber to or uncoupling it from another fiber. Optionally, an extension of shoulder 127 is formed with an alignment tooth 128 used to align a grabber comprised in the mover. Operation of the reflector, alignment tooth and a mover are discussed below with reference to FIGS. 9 and 10.

Figure 8:
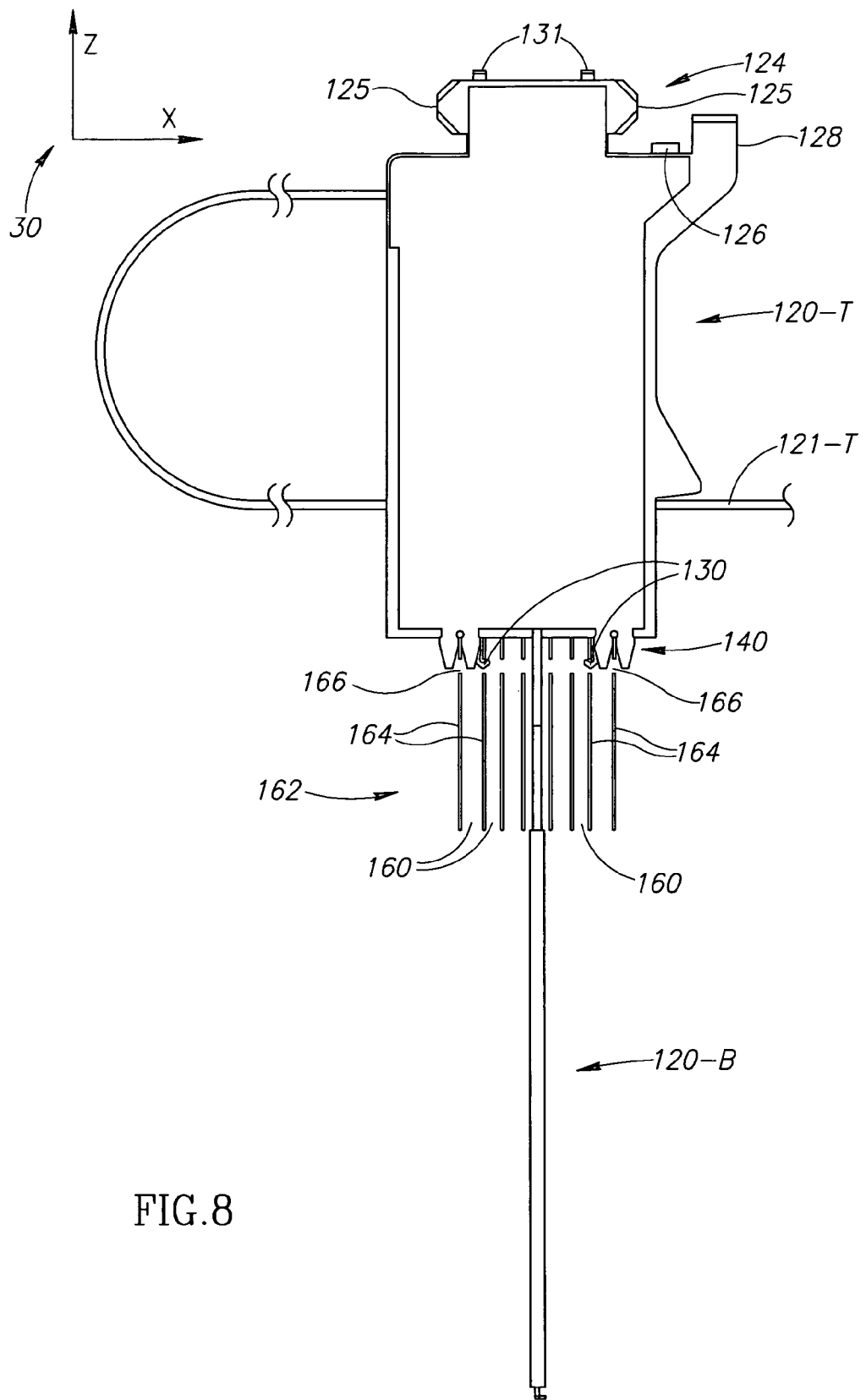
FIG. 8 schematically shows a side view of the fiber-end carriages shown in FIG. 7, in accordance with an embodiment of the invention.

FIG. 8 schematically shows a side view of top and bottom fiber-end carriages 120-T and 120-B shown in FIG. 7 and cross sections of sockets 160 of a honeycomb array 162, partially shown, into which the carriages are plugged, in accordance with an embodiment of the invention. Each socket 160 is partially defined by walls 164 formed having a latch hole 166. Latching hooks 130 of fiber-end carriage 120-T are hooked into latch holes 168, to lock the fiber-end carriage to honeycomb array 162 and fiber-end coupler 122-T in a socket 160. Optionally, socket 160 into which fiber end coupler 122-T is inserted, is equidistant from both latching hooks 130. Each socket prong 140 of fiber-end carriage 120-T seats on a wall 164 of honeycomb 162 stabilizing the fiber-end carriage position. Bottom fiber-end carriage 120-B is similarly hooked into honeycomb array 162. However, latching hooks 130 of bottom fiber-end carriage 120-B hook into walls perpendicular to wall 164,—which are not shown in the perspective of FIG. 8.

Figure 9:
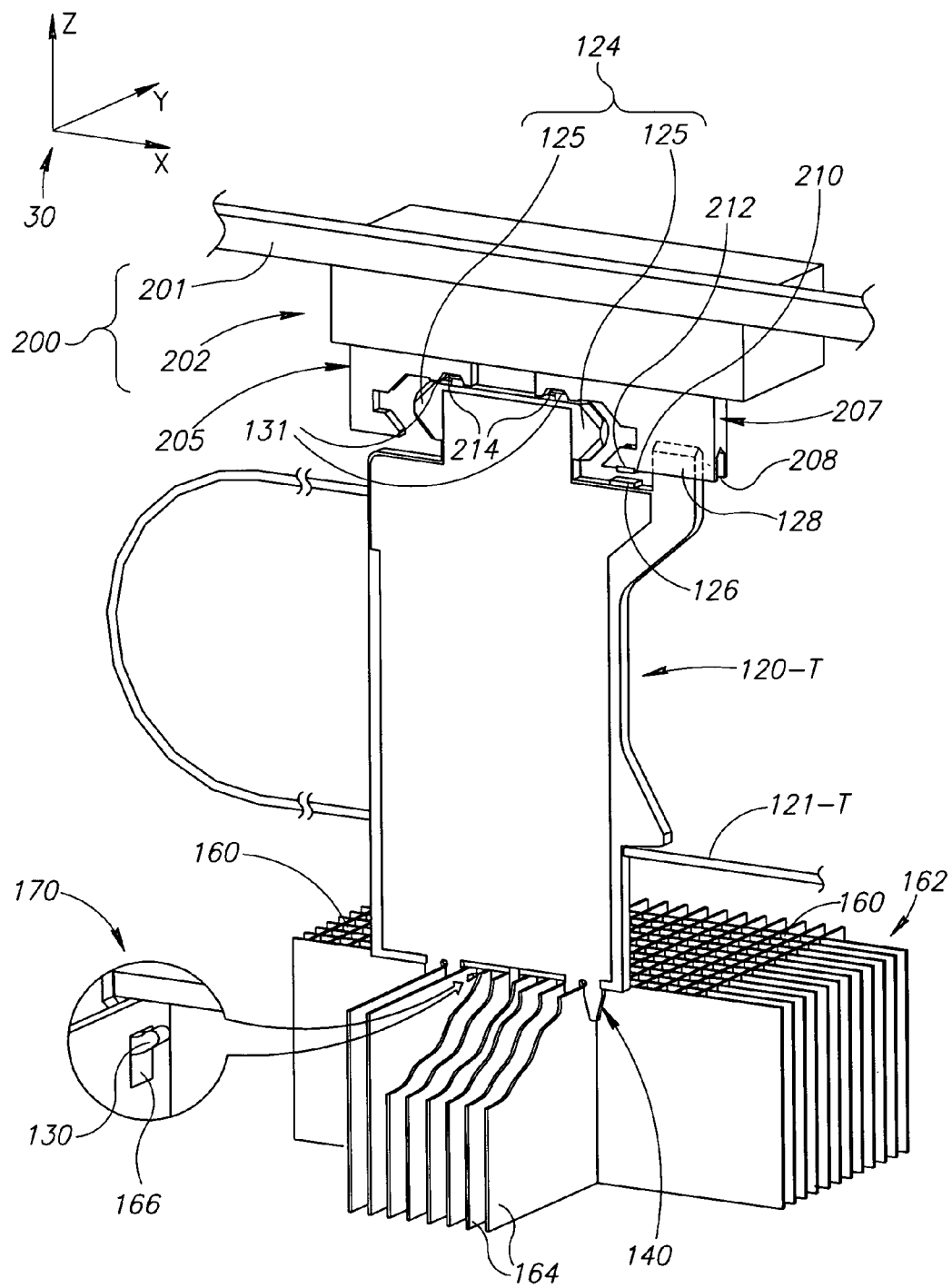
FIG. 9 schematically shows a perspective view of a fiber-end carriage shown in FIGS. 7 and 8 and a mover for moving the fiber-end carriage, in accordance with an embodiment of the invention.

FIG. 9 schematically shows a perspective view of top fiber-end carriage 120-T plugged into honeycomb array 162, with latching hooks 130 hooked into latch hole 166 and bifurcated prongs 140 seated on walls 164, in accordance with an embodiment of the invention. An inset 170 schematically shows an enlarged perspective view of a latching hook 130 of the fiber-end carriage hooked into a latch hole 166.

Figure 10:
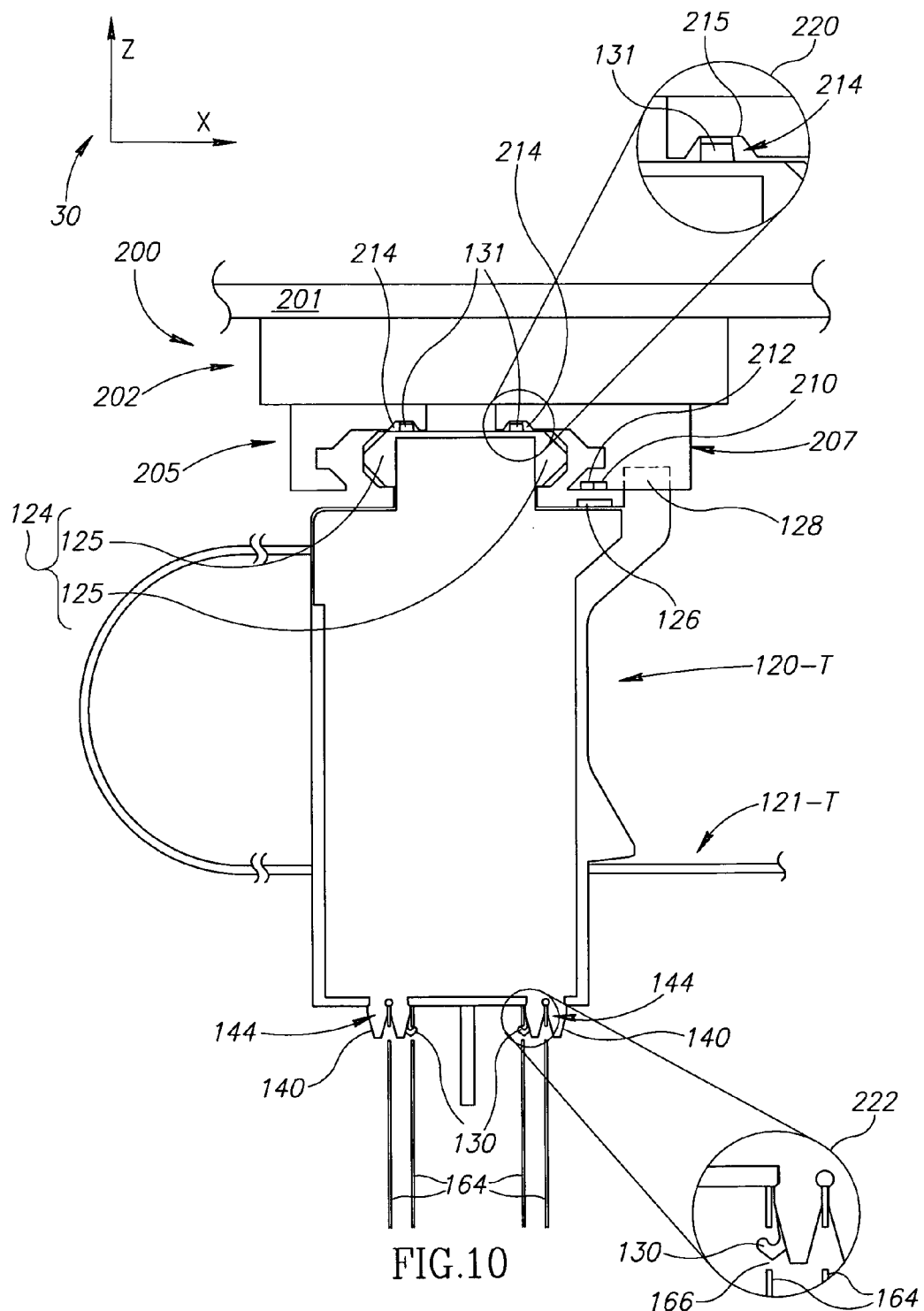
FIG. 10 schematically shows a side view of the fiber-end carriage and a mover shown in FIG. 9, in accordance with an embodiment of the invention.

An overhead mover 200 is shown beginning a process of grabbing the top fiber-end carriage to move it optionally to a parking position or to another socket so that its optic fiber 121-T can be optically coupled to an optic fiber other than 121-B (FIG. 7), in accordance with an embodiment of the invention. FIG. 10 schematically shows a side view of fiber-end carriage 120-T and mover 201 shown in FIG. 9. In FIG. 10 only walls 164 of honeycomb 162 that are hooked by latching hooks 130 and engaged by bifurcated socket prongs 140 are shown.

Mover 200 comprises a carrier beam 201 controllable to move along the y-direction by a suitable crossbar switch controller, such as controller 29 shown in FIG. 1, and a grabber 202 controllable by the controller to move along the carrier beam 201. Grabber 202 comprises left and right hand jaws 205 and 207 shaped to receive protrusions 125 of carrying handle 124. The grabber is controllable by the controller to raise and lower grabber jaws 205 and 207 and to move the jaws toward each other and away from each other to respectively grab and release protrusions 125 and thereby carrier handle 124. Right hand jaw 207 is optionally formed having an alignment recess 208 for receiving alignment tooth 128 and comprises a light source 210 and optical detector 212. Both right hand jaw 207 and left hand jaw 205 are formed having an optionally trapezoidal recess 214, clearly shown and indicated in an inset 220 in FIG. 10 for receiving latch hook ears 131.

To grab carrier handle 124 of fiber-end carriage 120-T, the controller controls carrier beam 201 to position itself at a same y-coordinate (coordinate system 30) as the fiber-end carriage and moves grabber 202 to a position over the fiber-end carriage so that jaws 205 and 207 can be lowered to engage and grab carrier handle 124. Optionally, to aid in positioning carrier beam 201 and grabber 202, the crossbar controller controls light source 210 to transmit light in a direction, i.e. the minus z-direction, so that when grabber 202 is positioned over fiber-end carriage 120-T, light from the light source is reflected by reflector 126 towards detector 212. Optionally, the controller uses intensity of light reflected to detector 212 to determine if grabber 202 is properly positioned over fiber-end carriage 120-T and/or in which direction to move carrier beam 201 and/or grabber 202 to properly position the grabber over the fiber-end carriage. Once properly positioned over fiber-end carriage 120-T, the controller lowers jaws 205 and 207 to positions at which they can be moved toward each other to engage protrusions 125 of carrier handle 124 to grab the carrier handle.

In accordance with an embodiment of the invention, as jaws 205 and 207 are lowered, alignment tooth 128 is received in alignment recess 208 of right hand jaw 207 and contact of the alignment tooth with walls of the recess provides fine alignment of jaws 205 and 207 with carrier handle 124. (A portion of alignment tooth inside recess 208 is shown in dashed lines.) As the jaws reach positions at which they can be moved toward each other to engage protrusions 125 a top surface 215 of each trapezoidal recess 214 (see inset 220 in FIG. 10) presses latch hook ears 131 downward (minus z-direction). The latch hook ears are configured and coupled to latching hooks 130 so that when they are displaced downward, latching hooks 130 also displace downward so that they may be extracted from latch hook holes 166. The downward displacement of latching hooks 130 relative to the latch hook holes 166 is shown in an enlarged view for one latching hook 130 in an inset 222 in FIG. 10.

Figure 11:
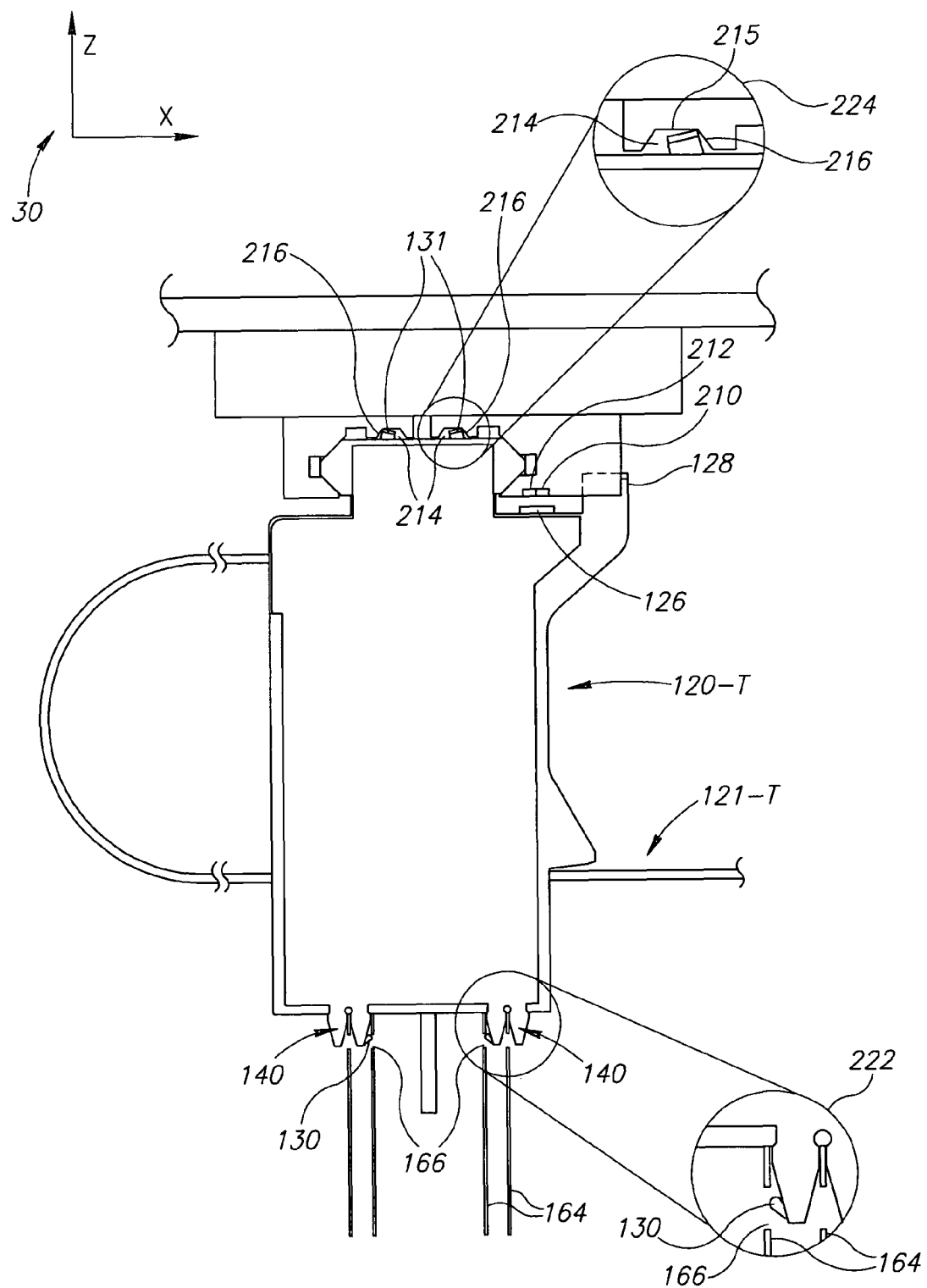
FIG. 11 schematically shows the fiber-end carriage and a mover shown in FIG. 10 with the mover grabbing the fiber-end carriage, in accordance with an embodiment of the invention.

When subsequently jaws 205 and 207 are moved towards each other to grab protrusions 125, an angled surface 216 of each trapezoidal recess 214 engages a latch hook ear 131 and tilts the ears toward each other as schematically shown in FIG. 11. An inset 224 schematically shows one of latch ears 131 engaged and tilted by surface 216. Motion of latch hook ears 131 towards each other moves latching hooks 130 away from each other and out of latch holes 166 in which they were hooked. An inset 226 schematically shows an enlarged view of one of latching hooks 130 moved out from latch hole 166 in which it was hooked by the action of angled surface 216. Once moved out from their respective latch holes 166, latching hooks 130 are free of the latch hook holes 166 and fiber-end carriage 120-T may be lifted up and away from honeycomb socket array 162 (FIG. 9) by mover 200.

Figure 12:
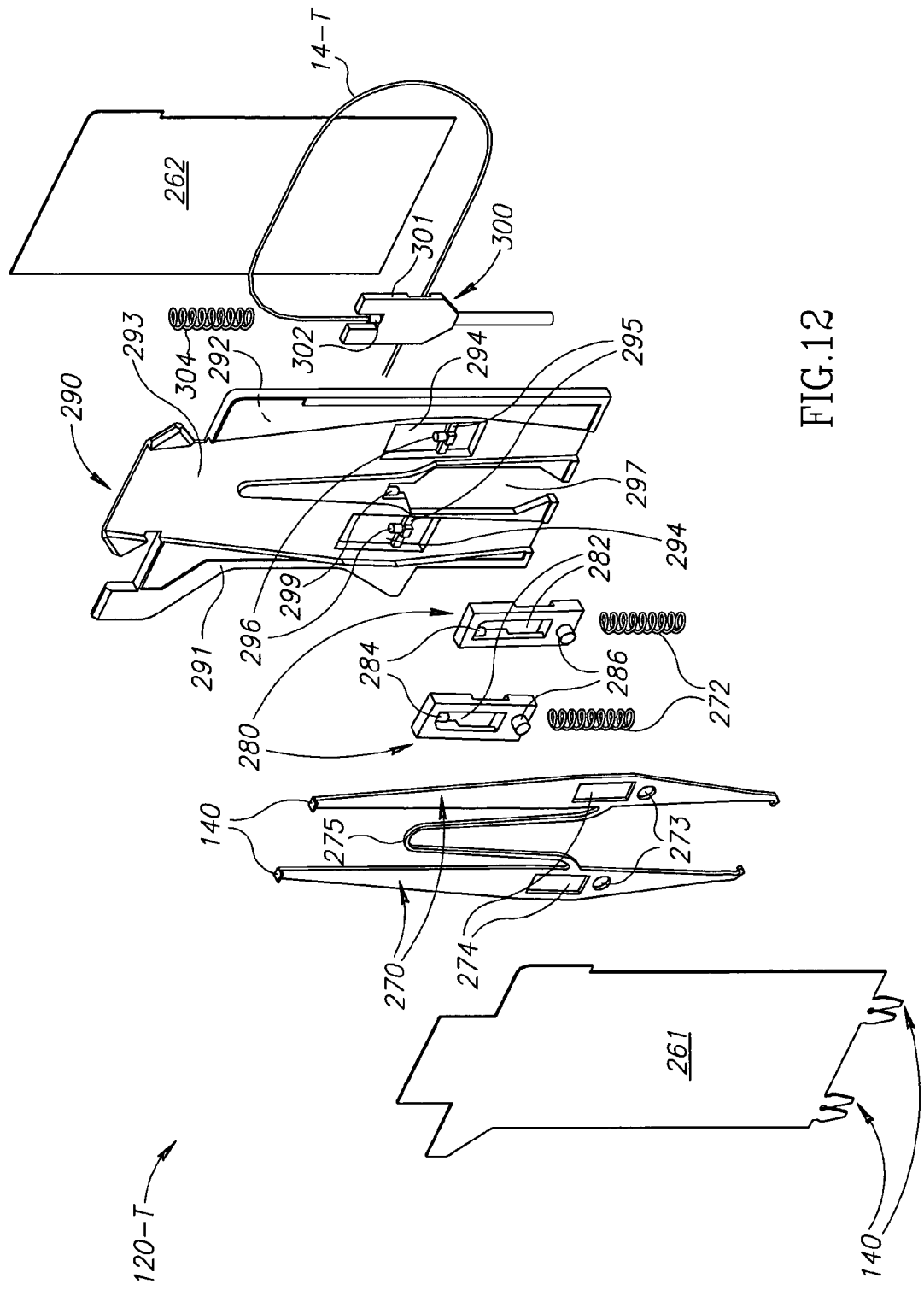
FIG. 12 schematically shows an exploded view of the fiber-end carriage shown in FIGS. 7-11, in accordance with an embodiment of the invention.

FIG. 12 schematically shows an exploded view of fiber-end carriage 120-T in accordance with an embodiment of the invention. The fiber-end carriage optionally comprises a first cover plate 261, latch hook levers 270, lever springs 272, lever spring housings 280, a carriage mounting frame 290, a fiber terminator 300, a terminator bias spring 304 and a second cover plate 262. When assembled, the various components of fiber-end carriage 120-T are mounted to mounting plate 290 and cover plates 261 and 262 respectively cover a first side 291 and a second side 292 of the mounting plate and function to keep components mounted to the frame in place. First cover plate 261, is also optionally formed having bifurcated socket prongs 140.

Figure 13:
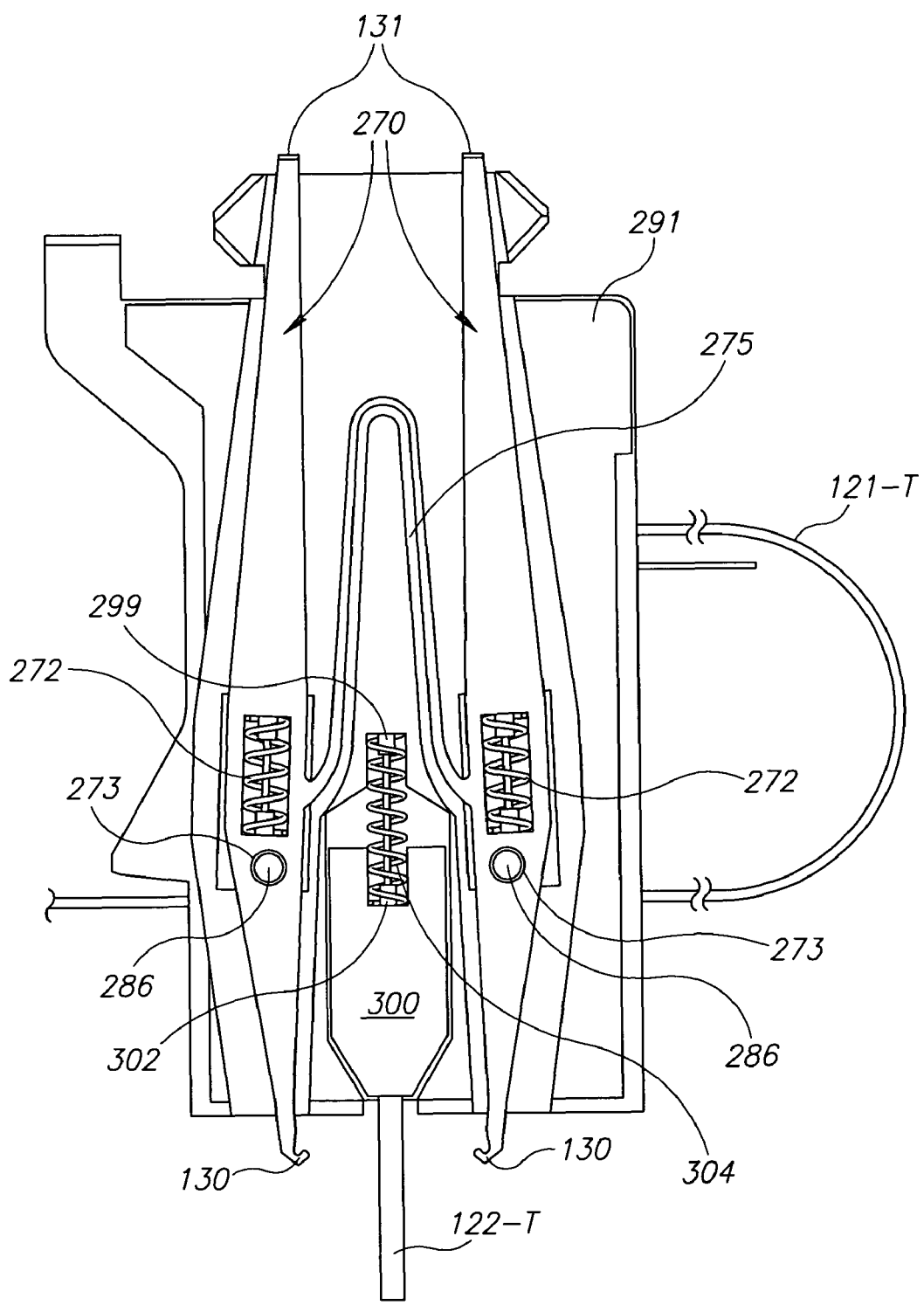
FIG. 13 schematically shows a partially assembled view of the fiber-end carriage shown in FIG. 12 from a first side of the carriage, in accordance with an embodiment of the invention.
Figure 14:
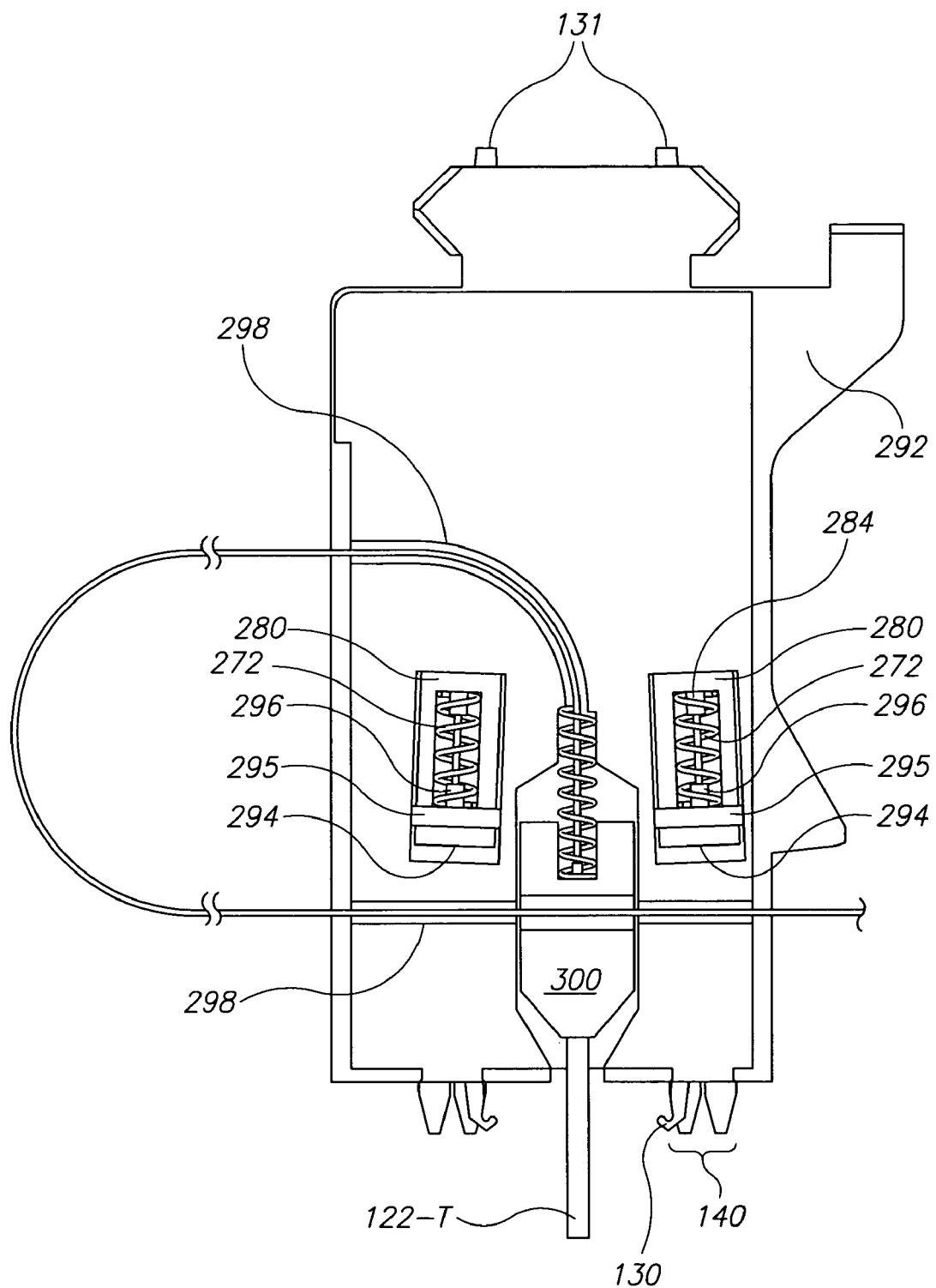
FIG. 14 schematically shows a partially assembled view of the fiber-end carriage shown in FIG. 12 from a second side of the carriage, in accordance with an embodiment of the invention.

FIG. 13 schematically shows a view of fiber end carriage 120-T from side 291 of mounting frame 290 in which the fiber end carriage is assembled except for first mounting plate 261. FIG. 14 schematically shows a view of fiber end carriage 120-T from side 292 of mounting frame 290 in which the fiber end carriage is assembled except for second mounting plate 262.

A first end of each latching hook lever 270 is formed having a latch hook 130 (FIGS. 9-11) and a second end of each lever is formed having a latch hook ear 140 (FIGS. 9-11). Each latching hook lever 270 is formed having a lever spring coupling hole 273 and a spring accommodation hole 274. A "wishbone" spring 275 couples latching hook levers 270. In the absence of force applied to latch ears 131, wishbone spring 275 maintains distance between latching hooks 130 so that if fiber-end carriage 120-T is plugged into honeycomb socket array 162 (FIG. 9), each latching hook 130 remain resiliently hooked into a latch hook hole 166 (FIGS. 8 and 9). Latching hook levers 270 and wishbone spring 275 are optionally formed as an integral structure from a suitable metal or plastic.

Each lever spring housing 280 is optionally formed having an insert space 282 for receiving a lever spring 272, a lever spring mounting button 284 for holding the lever spring in place in insert space 282. Lever spring housing 280 comprises a coupling nub 286 that is inserted into a lever spring coupling hole 273 in a latching hook lever 270 for coupling the housing and thereby lever spring 272 to the latching hook lever. When fiber-end carriage 120-T is assembled, lever springs 272 maintain latching hooks 130 retracted towards the mounting frame 290 and if fiber end carriage is plugged into honeycomb 162, the springs maintain the latching hooks engaged with the top edges of latch hook holes 166 in which they are inserted as shown in inset 170 in FIG. 9. Lever springs 272 are compressed by pressure from top surfaces 215 of trapezoid recesses 214 (inset 220 in FIG. 10) formed in jaws 205 and 207 when grabber 202 is lowered to grab fiber-end carriage 120-T. When the springs are compressed, latching hooks 130 are displaced away from the top edges of latch hook holes 166, as shown in inset 222 of FIG. 11.

Fiber terminator 300 has a body 301 comprising fiber-end coupler 122-T (FIG. 8) and is optionally formed with a terminator spring mounting button 302 for connecting the terminator to terminator spring 304.

The various components of fiber-end carriage 120-T shown in FIG. 12 are mounted to mounting frame 290 and the mounting frame is formed having an indentation 293 for receiving latching hook levers 270 and wishbone 275 on first side 291 of the mounting frame and holes 294 for receiving lever spring housings 280 and their associated lever springs 272. A lever spring support bar 295 having a mounting nub 296 formed thereon spans each hole 294. The support bar and nub are used to mount lever spring 272 in the hole 294 as shown in FIG. 14. The mounting frame is also optionally formed having a hole 297 for receiving fiber terminator 300 and second side 292 of the mounting frame is formed having channels 298 for receiving optical fiber 121-T which is connected to the fiber terminator. Second side 292 the configuration of lever spring housings 280 and their respective lever springs 272 in holes 294 and fiber channels 298 are shown in FIG. 14.

In the description and claims of the present application, each of the verbs, "comprise" "include" and "have", and conjugates thereof, are used to indicate that the object or objects of the verb are not necessarily a complete listing of members, components, elements or parts of the subject or subjects of the verb.

The present invention has been described using detailed descriptions of embodiments thereof that are provided by way of example and are not intended to limit the scope of the invention. The described embodiments comprise different features, not all of which are required in all embodiments of the invention. Some embodiments of the present invention utilize only some of the features or possible combinations of the features. Variations of embodiments of the present invention that are described and embodiments of the present invention comprising different combinations of features noted in the described embodiments will occur to persons of the art. The scope of the invention is limited only by the following claims.

The invention claimed is:

1. An optical crossbar switch for optically coupling optic fibers comprising:
    at least one first fiber and a plurality of second fibers;
    a moveable fiber-end carriage coupled to an end of the at least one first fiber and having at least one latching hook and being constrained to move along a predetermined trajectory;
    at least one moveable slack-control carriage coupled to the body of the at least one first fiber and constrained to move along a predetermined trajectory;
    an array of sockets defined by walls, at least one of which walls of each sockets formed having a latch hole for receiving the latching hook; and
    at least one moving device controllable to move the carriages;
    wherein to optically couple a first fiber to a second fiber, the at least one moving device moves the fiber-end carriage of at least one of the first and second fibers to a socket and inserts the fiber's fiber end into the socket so that the at least one latching hook latches into the latch hole and secures the carriage to the socket array.

2. An optical crossbar switch according to claim 1 wherein the latching hooks are spring loaded.

3. An optical crossbar switch according to claim 2 wherein the moving device is configured to oppose the spring loading of the at least one latching spring to insert or extract the fiber end into the socket.

4. An optical crossbar switch according to claim 1 wherein the fiber-end carriage comprises an optical reflector.

5. An optical crossbar switch according to claim 1 wherein the moving device comprises a light source and an optical detector and the moving reflects light from the light source from the reflector towards the detector to determine if the moving device is aligned with the fiber-end carriage.

6. An optical crossbar switch according to claim 1 wherein the fiber end carriage comprises at least one bifurcated prong that seats on a wall of a socket when the fiber end is inserted into a socket.

\* \* \* \* \*